(12) United States Patent
Puttamalla et al.

(10) Patent No.: US 11,064,108 B2
(45) Date of Patent: Jul. 13, 2021

(54) FRAME RATE CONTROL FOR MEDIA CAPTURE BASED ON RENDERED OBJECT SPEED

(71) Applicant: SONY CORPORATION, Tokyo (JP)

(72) Inventors: Prashanth Puttamalla, Bangalore (IN); Ashwin Kulkarni, Bangalore (IN); Sankar Shanmugam, Banglore (IN)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/546,760

(22) Filed: Aug. 21, 2019

(65) Prior Publication Data

US 2021/0058547 A1 Feb. 25, 2021

(51) Int. Cl.
*H04N 5/232* (2006.01)
*G06T 7/246* (2017.01)

(52) U.S. Cl.
CPC ......... *H04N 5/23218* (2018.08); *G06T 7/248* (2017.01); *H04N 5/23245* (2013.01); *G06T 2207/10016* (2013.01)

(58) Field of Classification Search
CPC ............ H04N 5/23218; H04N 5/23245; G06T 7/248; G06T 2207/10016
See application file for complete search history.

(56) References Cited

U.S. PATENT DOCUMENTS 9,438,868 B2  9/2016 Boettiger
10,484,600 B2* 11/2019 Baek .................... H04N 5/2258

| 2004/0236807 | A1* | 11/2004 | Hsiung | H04N 5/265 708/200 |
|---|---|---|---|---|
| 2005/0052553 | A1* | 3/2005 | Kido | H04N 5/23245 348/296 |
| 2010/0053345 | A1* | 3/2010 | Kim | H04N 5/232 348/208.4 |
| 2012/0242853 | A1* | 9/2012 | Jasinski | H04N 5/23245 348/222.1 |
| 2017/0332016 | A1* | 11/2017 | Miyakawa | H04N 5/225 |
| 2018/0227487 | A1* | 8/2018 | Heo | H04N 5/23254 |

FOREIGN PATENT DOCUMENTS

CN      104967803 B    1/2018

* cited by examiner

*Primary Examiner* — Padma Haliyur
(74) *Attorney, Agent, or Firm* — Chip Law Group

(57) ABSTRACT

A media processing apparatus and method for frame rate control based on rendered objects. The media processing apparatus receives a first plurality of image frames which may include a first plurality of objects from a first image capturing device. The media processing apparatus receives a first user input corresponding to a first object from a first media rendering device. The media processing apparatus determines a first speed of movement of the first object based on an analysis of a first set of consecutive image frames from the first plurality of image frames and calculates a first frame rate based on the determined first speed of movement of the first object. The first image capturing device captures a second plurality of image frames at the first frame rate. The media processing apparatus transmits the captured second plurality of image frames to the first media rendering device.

22 Claims, 8 Drawing Sheets

FRAME RATE CONTROL FOR MEDIA CAPTURE BASED ON RENDERED OBJECT SPEED

CROSS-REFERENCE TO RELATED APPLICATIONS/INCORPORATION BY REFERENCE

None.

FIELD

Various embodiments of the disclosure relate to media capture. More specifically, various embodiments of the disclosure relate to a media processing apparatus and a method for frame rate control for media capture based on rendered object speed.

BACKGROUND

Recent advancements in the field of media capture have led to development of various techniques to control various parameters for the media capture. Typically, a media capturing device may capture a media (for example video) based on a preset frame rate as a capture parameter. The frame rate may define a speed at which a plurality of image frames may be captured to generate the media. In certain solutions, the media capturing device captures the images of a sequence (or scene) at a fixed frame rate or a frame rate initially defined by a user. However, in certain situations, the fixed or user-defined frame rate may not be appropriate considering a change in the sequence on run-time basis while the capture of the media. For example, in situations where the defined frame rate is lower than the actual demand of the sequence, may result in the capture of a low-quality media. In other situations, where the defined frame rate is higher than the actual demand of the sequence, may result in undesired utilization of resources (for example CPU usage, memory, or network bandwidth) of the media capturing device.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A media processing apparatus and a method for frame rate control for media capture based on rendered object speed is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
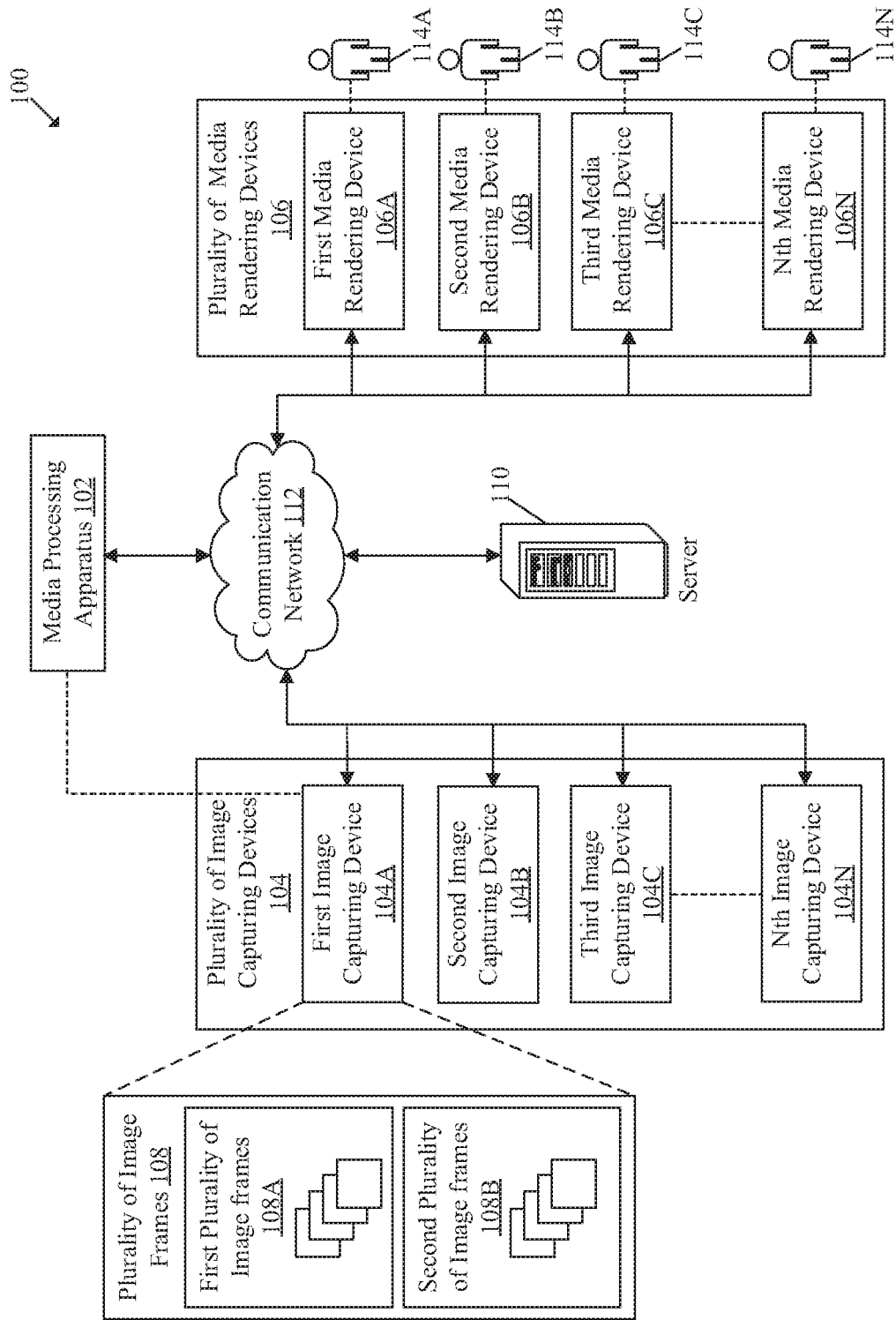
FIG. 1 is a block diagram that illustrates an exemplary network environment for frame rate control for media capture based on a rendered object speed, in accordance with an embodiment of the disclosure.

The following described implementations may be found in a disclosed media processing apparatus and a method for dynamic frame rate control for media capture based on speed of movement of rendered object. Exemplary aspects of the disclosure provide a media processing apparatus that may be configured to receive a first plurality of image frames from a first image capturing device (for example a camera or an imaging sensor). The first plurality of images may be initially captured by the first image capturing device over a time period (for example few seconds during a preview mode of capture) based on a default/defined frame rate. The default/defined frame rate may be initially set by a manufacturer of the first image capturing device or can be set by a user associated with the first image capturing device or the media processing apparatus. The first plurality of images may include a plurality of objects which may be static or moving objects. Examples of the moving objects may be, but are not limited to, a moving car, a walking human being, or a moving animal. The disclosed media processing apparatus may dynamically calculate the speed of movement (in Kilometer/hour (Kmph) or miles/hour(mph)) of one or more moving objects of the plurality of objects. The media processing apparatus may calculate the frame rate for the first image capturing device based on the calculated speed of movement of the one or more moving objects. The one or more moving objects may be predefined or selected by a user associated with the media processing apparatus. In some embodiments, the one or more moving objects may be selected at a media rendering device (for example a display device) at which the first plurality of images may be displayed. The media rendering device may be different from the media processing apparatus and the first image capturing device.

In accordance with an embodiment, the disclosed media processing apparatus may change the frame rate of the first image capturing device from the default frame rate to the calculated frame rate to further capture a second plurality of image frames (for example in normal recording). The combination of the first plurality of image frames and the second plurality of image frames may form a media or video content. In accordance with an embodiment, the disclosed image processing apparatus may further control the frame rate of the image capturing device based on the change of selection of the moving objects or related speed of movement on the run-time basis. Thus, the disclosed image processing device provides the dynamic adjustment of the frame rate for media capture based on the change in the sequence and the speed of movement of the included objects at run-time, to ensure high-quality media generation with effective utilization of resources (for example CPU utilization, memory usage, network bandwidth).

In accordance with an embodiment, the media processing apparatus may transmit the captured second plurality of image frames in a continuous manner (e.g. live streaming) to a plurality of media rendering devices. The media processing apparatus may receive one or more user inputs as the selection of different moving objects from the plurality of media rendering device. The disclosed media processing apparatus may further dynamically adjust the frame rate to capture the second plurality of image frames in continuous manner based on the user inputs received from the plurality of media rendering devices.

The disclosed media processing apparatus may further consider a display frame rate capability of different media rendering devices before the transmission of the second plurality of image frames captured based on the calculated frame rate. The disclosed media processing apparatus may further upscale or downscale the frame rate of the captured media based on the display frame rate capability of different media rendering devices.

The disclosed media processing apparatus may receive the second plurality of image frames or the first plurality of image frames from a plurality of image capturing devices, where different image capturing devices may have different field of views or capture angles to capture the same sequence or scene. The disclosed media processing apparatus may synchronize the calculated frame rate between the plurality of image capturing devices on run-time in response to a dynamically changed frame rate based on the speed of movement or selection of one or more objects captured by one of the plurality of image capturing devices.

In accordance with an embodiment, the disclosed media processing apparatus may receive a plurality user inputs corresponding to different moving objects from the plurality of media rendering devices. The disclosed media processing apparatus may control the first image capturing device to capture the second plurality of image frames at a maximum frame rate among all the frame rates corresponding to the plurality of different moving objects. The disclosed media processing apparatus may process (up sample or downsample) the captured second plurality of image frames according to the corresponding frame rate for each selected moving object for different media rendering devices. Thus, the disclosed media processing apparatus provide dynamic adjustment of the frame rate based on the speed of the moving objects in the plurality of image frames.

FIG. 1 is a block diagram that illustrates an exemplary network environment for frame rate control for media capture based on a rendered object speed, in accordance with an embodiment of the disclosure. With reference to FIG. 1, there is shown a network environment 100. The network environment 100 may include a media processing apparatus 102, a plurality of image capturing devices 104, a plurality of media rendering devices 106, a server 110, and a communication network 112. The media processing apparatus 102 may be communicatively coupled to the plurality of image capturing devices 104, the plurality of media rendering devices 106, and the server 110, via the communication network 112. The plurality of image capturing devices 104 may include a first image capturing device 104A, a second image capturing device 104B, and a third image capturing device 104C. The first image capturing device 104A may capture a plurality of image frames 108. The plurality of image frames 108 may include a first plurality of image frames 108A and a second plurality of image frames 108B as shown in FIG. 1. There is further shown a plurality of users 114A-114N associated with the plurality of media rendering devices 106. In FIG. 1, the media processing apparatus 102 and the first image capturing device 104A are shown as two separate devices; however, in some embodiments, the entire functionality of the first image capturing device 104A may be included in the media processing apparatus 102, without a deviation from scope of the disclosure.

The media processing apparatus 102 may comprise a suitable logic, circuitry, interfaces, and/or code that may be configured to receive a first plurality of image frames 108A from the first image capturing device 104A of the plurality of image capturing devices 104. The first plurality of image frames 108A may be captured over a time period (for example for few seconds in a preview mode of the first image capturing device 104A) in a default or a defined frame rate. The first plurality of image frames 108A may include a first plurality of objects (shown in FIG. 3A). The media processing apparatus 102 may be configured to transmit the first plurality of images frames 108A to the first media rendering device 106A or the plurality of media rendering devices 106 (different from the media processing apparatus 102). The media processing apparatus 102 may be further configured to receive a first user input from the first media rendering device 106A. The first user input may correspond to selection of a first object (i.e. moving object) from the first plurality of objects present in the first plurality of image frames 108A.

In accordance with an embodiment, the media processing apparatus 102 may be further configured to determine a first speed of movement of the first object based on an analysis of a first set of consecutive image frames from the first plurality of image frames 108A. The media processing apparatus 102 may be further configured to calculate a first frame rate (i.e. may be different from the default or defined frame rate) based on the determined first speed of movement of the first object. The media processing apparatus 102 may be configured to control the first image capturing device 104A to capture a second plurality of image frames 108B based on the calculated first frame rate. The first image capturing device 104A captures the second plurality of image frames 108B (for example in a normal recording state) at the calculated first frame rate. The media processing apparatus 102 may be further configured to transmit the captured second plurality of image frames 108B to the first media rendering device 106A or the plurality of media rendering devices 106. In some embodiments, the media processing apparatus 102 may be configured to synchronize the calculated first frame rate between the plurality of image capturing devices 104. Examples of the media processing apparatus 102 may include, but are not limited to, a video processing device, a video editing system, a video editing controller, a media production system, a computer workstation, a mainframe computer, a handheld computer, a mobile phone, a smart appliance, a video player, a digital camera, a video camera, a media server, and/or other computing device with image processing capability.

The first image capturing device 104A may comprise a suitable logic, circuitry, interfaces, and/or code that may be configured to capture the plurality of image frames 108 as video or media content. The plurality of image frames (i.e. the first plurality of image frames 108A or second plurality of image frames 108B) may be captured in a field-of-view (FOV) or at a particular capture angle of the first image capturing device 104A. The first image capturing device 104A may be configured to capture the plurality of image frames 108 at a particular frame rate selected either as default, based on user-input, or dynamically changed based on the speed of moving objects in the plurality of image frames 108. Examples of the image capturing devices 104 may include, but are not limited to, an image sensor, a wide-angle camera, an action camera, a closed-circuit television (CCTV) camera, a camcorder, digital camera, a time-of-flight camera (TOF camera), a night-vision camera, 360-degree view camera, and/or other such in-vehicle cameras or sensors.

The first media rendering device 106A of the plurality of media rendering devices 106 may be a suitable logic, circuitry, interfaces, and/or code that may be configured to display the plurality of image frames 108 transmitted from the media processing apparatus 102. The first media rendering device 106A may comprise a display screen to display the first plurality of image frames 108A or the second plurality of image frames 108B to a first user 114A associated with the first media rendering device 106A. The first media rendering device 106A may be configured to receive a user input which corresponds to a first object from the first plurality of objects in the first plurality of image frames 108A or the second plurality of image frames 108B. The first media rendering device 106A may be further configured to transmit the user input to the media processing apparatus 102. Examples of the first media rendering device 106A may include, but are not limited to, a television device, a laptop, a display device, a computer, a mobile phone, a cellular telephone, or other electronic device associated with a display screen.

The server 110 may comprise a suitable logic, circuitry, interfaces, and code that may be configured to receive and store the plurality of image frames 108. In some embodiments, the server 110 may be configured to receive the first plurality of image frames 108A or the second plurality of image frames 108B from the first image capturing device 104A or one of the plurality of image capturing devices 104, via the communication network 112. The server 110 may be configured to receive user inputs about selection of the moving objects from the plurality of media rendering devices 106. The server 110 may be configured to determine the speed of movement of the moving objects detected from the received plurality of image frames 108 or selected based on the received user inputs. The server 110 may be further configured to calculate a first frame rate based on the determined speed of movement of the moving objects. The server 110 may be further configured to control the first image capturing device 104A, via the communication network 112, to capture the second plurality of image frames 108B based on the calculated first frame rate.

The server 110 may be implemented as a cloud server which may execute operations through, but not limited to, web applications, cloud applications, HTTP requests, repository operations, file transfer, and the like. Other examples of the server 110 may include, but are not limited to a database server, a file server, a web server, a media server, an application server, a mainframe server, a cloud server, or other types of servers. In one or more embodiments, the server 110 may be implemented as a plurality of distributed cloud-based resources by use of several technologies that are well known to those skilled in the art. A person with ordinary skill in the art will understand that the scope of the disclosure may not be limited to implementation of the server 110 and media processing apparatus 102 as separate entities. In certain embodiments, the functionalities of the server 110 may be incorporated in its entirety or at least partially in the media processing apparatus 102, without departure from the scope of the disclosure.

The communication network 112 may include a communication medium through which the media processing apparatus 102, the plurality of image capturing devices 104, the plurality of media rendering devices 106, and the server 110 may communicate with each other. The communication network 112 may be a wired or wireless communication network. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity(Li-Fi), 802.16, IEEE 802.11s, IEEE 802.11g, multi-hop communication, wireless access point (AP), device to device communication, cellular communication protocols, and Bluetooth (BT) communication protocols.

In operation, the media processing apparatus 102 may receive a user input to start a video or media recording from the first image capturing device 104A or the media processing apparatus 102. The video recording may be an internal feature of the first image capturing device 104A or the media processing apparatus 102. In some embodiments, the user input may be an initiation of an image/video capturing application (or API) or a smart video mode installed on the first image capturing device 104A or the media processing apparatus 102 to capture media or video. In some embodiments, the user input may be provided through a video recording button placed on the media processing apparatus 102.

The smart video mode of the video recording may be to dynamically adapt the frame rate of the first image capturing device 104A based on the speed of movement of selected moving objects. In response to receipt of the user input, the media processing apparatus 102 may control the first image capturing device 104A to operate in a preview mode for a first time period (for example few seconds). The media processing apparatus 102 may be associated with the plurality of image capturing devices 104 including the first image capturing device 104A. In some embodiments, the first image capturing device 104A may be integrated into the media processing apparatus 102.

The media processing apparatus 102 may be further configured to control the first image capturing device 104A of the plurality of image capturing devices 104 to capture a first plurality of image frames 108A of a scene or sequence at a defined frame rate based on the received user input. The first plurality of image frames 108A may be captured in the preview mode. In some embodiments, the first image capturing device 104A may retrieve a user-defined frame rate from an in-built memory (not shown in FIG. 1) to capture the first plurality of image frames 108A. The first plurality of image frames 108A may be captured over the first time period (for example in few seconds in the preview mode) and may include images or icons of a first plurality of objects including, an animate object, an inanimate object, or a combination thereof. In accordance with an embodiment, the first plurality of objects may include a static object (for example a building, a signboard, or a tree) or a moving object (for example moving car, moving human being, or moving animal).

The media processing apparatus 102 may be further configured to receive the first plurality of image frames 108A from the first image capturing device 104A via the communication network 112. The first plurality of image frames 108A may be recorded over the first time period (for example few seconds in the preview mode) in the in-built memory of the first image capturing device 104A. The media processing apparatus 102 may be further configured to transmit the received first plurality of image frames 108A to the first media rendering device 106A or the plurality of media rendering devices 106. The first media rendering device 106A may be configured to receive the first plurality of image frames 108A including the first plurality of objects from the media processing apparatus 102 and display the received first plurality of image frames 108A to the first user 114A via a display screen (such as a display screen 212 shown in FIG. 4). The first image rendering device 106A may be further configured to receive a first user input (for example through a gaze detection, hand gesture detection, or a touch input) which may correspond to a first object from the first plurality of objects and further configured to transmit information about the first user input to the media processing apparatus 102. The first object may be an object in which a user associated with the first media rendering device 106A may be interested. The first object may be a moving object or continuously changing its position in the consecutive image frames of the first plurality of image frames 108A.

In accordance with an embodiment, the media processing apparatus 102 may be configured to receive the first user input corresponding to the first object from the first media rendering device 106A. The media processing apparatus 102 may be further configured to determine the speed of movement of the first object by an analysis of a first set of consecutive image frames from the first plurality of image frames 108A. The first set of consecutive image frames may be few consecutive image frames in the first plurality of image frames 108A. In some embodiments, the first set of consecutive image frames may correspond to all image frames of the first plurality of image frames 108A. The media processing apparatus 102 may be configured to determine the speed of movement of the first object based on the analysis of shift or change in pixel information of the first object included in the first set of consecutive image frames. The determination of the speed of movement of the first object is described in detail, for example, in FIG. 3A.

In accordance with an embodiment, the media processing apparatus 102 may be further configured to calculate a first frame rate based on the determined first speed of movement of the first object. The media processing apparatus 102 may calculate the first frame rate based on a defined set of rules or based on a look-up table (as shown in table 2) which may indicate a relation between the first frame rate and the first speed of movement of objects. The first frame rate may be utilized by the first image capturing device 104A to capture a second plurality of image frames 108B in a recording mode (i.e. different from the preview mode). The process of calculation of the first frame rate is described in detail, for example, in FIG. 3B and Tables 1-2.

The media processing apparatus 102 may be further configured to control the first image capturing device 104A to capture the second plurality of image frames 108B based on the calculated first frame rate. The media processing apparatus 102 may be configured to communicate the calculated first frame rate to the first image capturing device 104A via the communication network 112 for the control of the first image capturing device 104A. The first image capturing device 104A may change the default/defined frame rate to the calculated first frame rate received from the media processing apparatus 102. The second plurality of image frames 108B may be a media or video captured in a normal recording state of the first image capturing device 104A. In some embodiments, the media processing apparatus 102 may communicate one or more instructions to the first image capturing device 104A to change the default/defined frame rate to the calculated first frame rate. The first image capturing device 104A may capture the second plurality of image frames 108B at the calculated frame rate instead of the default/pre-defined frame rate. In some embodiments, the second plurality of image frames 108B may correspond to the subsequent image frames of the scene captured over a second time period after the first time period.

The first image capturing device 104A may be configured to transmit the second plurality of image frames 108B to the media processing apparatus 102, via the communication network 112. The media processing apparatus 102 may be further configured to receive the second plurality of images frames 108B and transmit the received second plurality of image frames 108B to the first media rendering device 106A so that the first user 114A associated with the first media rendering device 106A may view the second plurality of image frames 108B on the display screen of the first media rendering device 106A. In some embodiments, the first image capturing device 104A may be configured to directly transmit the second plurality of image frames 108B to the first media rendering device 106A without the communication through the media processing apparatus 102.

The media processing apparatus 102 may be further configured to receive a second user input from a second media rendering device 106B. The second user input may correspond to a second object from the first plurality of objects. In some embodiments, the second object may be selected from a second plurality of moving objects detected from the second plurality of image frames 108B rendered on the second media rendering device 106B The media processing apparatus 102 may be further configured to determine a second speed of movement of the second object based on the analysis of the first set of consecutive image frames from the first plurality of image frames 108A or a second set of consecutive image frames from the second plurality of image frames 108B. The media processing apparatus 102 may be further configured to calculate the first frame rate based on the determined first speed of movement of the first object and the second speed of movement of the second object.

The media processing apparatus 102 may be further configured to receive a user input to end the recording of the media or video. In response to the user input to end the recording, as a post-processing process, the media processing apparatus 102 may be configured to upscale the frame rate of the first plurality of image frame 108A which may be captured in the preview mode at the default frame rate, in case the first frame rate is higher than the default frame rate. The media processing apparatus 102 may be configured to generate one or more duplicate image frames of the first plurality of image frame 108A to upscale the frame rate of the first plurality of image frame 108A. The generated duplicate image frames are included with the first plurality of image frame 108A to upscale the frame rate of the first plurality of image frame 108A. In some embodiments, image frames may be interpolated based on the first plurality of image frame 108A to upscale the frame rate of the first plurality of image frame 108A. In another embodiment, one or more intermediate image frames the first plurality of image frame 108A may be predicted based on a machine learning technique to upscale the frame rate of the first plurality of image frame 108A.

In case, the first frame rate is lower than the default frame rate, the media processing apparatus 102 may downscale the frame rate of the first plurality of image frames 108A. The media processing apparatus 102 may be configured to drop one or more image frames from the first plurality of image frame 108A to downscale the frame rate of the first plurality of image frame 108A. The media processing apparatus 102 may be further configured to generate a first media file (i.e. first sequence) which may include the updated (upscaled or downscaled) first plurality of image frames 108A. The media processing apparatus 102 may be further configured to generate a second media file (i.e. second sequence) which may include the second plurality of image frame 108B captured at the first frame rate. The media processing apparatus 102 may further generate an output media file based on the combination of the first media file and the second media file, where total duration of the output media file may a sum of duration of the first media file (i.e. recorded in the preview mode over the first time period) and a duration of the second media file (i.e. recorded in the recording mode over a second time period).

In contrast with the conventional techniques, the disclosed media processing apparatus 102 dynamically adapt or change the frame rate of the first image capturing device 104A based on the speed of movement of the moving objects on real-time basis. The disclosed media processing apparatus 102 may capture the sequence or the scene at the best frame rate considering the object of interest for the first user 114A. Based on the dynamic adaptation of the frame rate of the first image capturing device 104A based on real-time change in the speed of movement of selected objects, the disclosed media processing apparatus 102 may provide high-quality media generation at optimal utilization of the resources (for example CPU occupancy, memory, or network bandwidth) at end of the media processing apparatus 102 and the first image capturing device 104A. For example, in case of detection of high-speed objects, the dynamic adaptation from a lower frame rate to a higher frame rate of the first image capturing device 104A may generate a high-quality media in which all frames of the high-speed objects are correctly captured. In another example, in case of detection of low-speed objects, the dynamic adaptation from a higher frame rate to a lower frame rate of the first image capturing device 104A may save (i.e. optimization) the utilization of the certain resources (i.e. CPU, memory) of the first image capturing device 104A or the media processing apparatus 102 to generate the media content. The lower utilization of the resources may be sufficient enough to capture images of the low-speed objects based on the lower frame rate.

Figure 2:
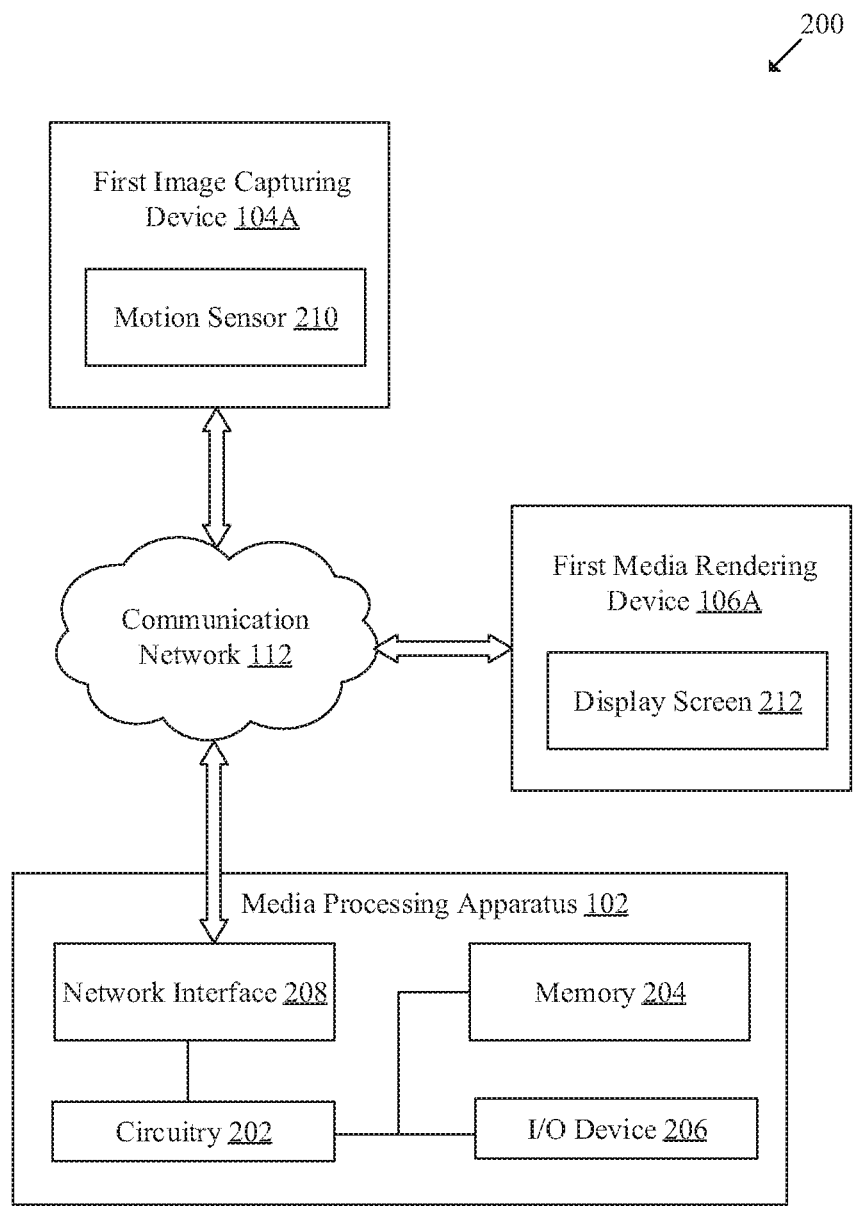
FIG. 2 is a block diagram that illustrates an exemplary media processing apparatus for frame rate control for media capture based on a rendered object speed, in accordance with an embodiment of the disclosure.

FIG. 2 is a block diagram that illustrates an exemplary media processing apparatus for frame rate control for a media capture based on rendered object speed, in accordance with an embodiment of the disclosure. FIG. 2 is explained in conjunction with elements from FIG. 1. With reference to FIG. 2, there is shown a block diagram 200 of the media processing apparatus 102. The media processing apparatus 102 may include circuitry 202, a memory 204, an input/output (I/O) device 206, and a network interface 208. The circuitry 202 may be communicatively coupled to the memory 204, the I/O device 206, and the network interface 208. In FIG. 2, there is further shown the first image capturing device 104A which may include a motion sensor 210. The first image capturing device 104A may be communicatively coupled to the circuitry 202, via the communication network 112 and the network interface 208. In FIG. 2, there is further shown, the first media rendering device 106A which may include a display screen 212 and may be communicatively coupled to the circuitry 202, via the communication network 112 and the network interface 208.

The circuitry 202 may comprise suitable logic, circuitry, interfaces, and/or code that may be configured to execute instructions stored in the memory 204. The executed instructions may correspond to at least a set of media processing operations which may include, but are not limited to, detection of objects included in the captured image frames, determination of speed of one or more objects selected by the first user 114A, calculation of frame rate based on the determined speed, and the control of the first image capturing device 104A to capture media or video based on the calculated frame rate. The circuitry 202 may be implemented based on processor technologies known in the art. Examples of the circuitry 202 may include, but are not limited to, a Graphical Processing Unit (GPU), a co-processor, a Central Processing Unit (CPU), x86-based processor, a Reduced Instruction Set Computing (RISC) processor, an Application-Specific Integrated Circuit (ASIC) processor, a Complex Instruction Set Computing (CISC) processor, and a combination thereof.

The memory 204 may comprise suitable logic, circuitry, interfaces, and/or code that may be configured to store the instructions to be executed by the circuitry 202. Also, the memory 204 may be configured to store the plurality of image frames 108. In some embodiments, the memory 204 may be configured to store the output media file generated based on the plurality of image frames 108 captured at different frame rates. In some embodiments, the memory 204 may include information of the plurality of objects selected by one of the plurality of media rendering devices 106. In some embodiments, the memory 204 may store the calculated frame rate to be communicated to the plurality of image capturing devices 104. In accordance with an embodiment, the memory 204 may include display characteristics information of the plurality of media rendering devices 106. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, interfaces, and/or code that may be configured to act as an I/O channel/interface between a user and the media processing apparatus 102. The I/O device 206 may comprise various input and output devices, which may be configured to communicate with different operational components of the media processing apparatus 102. Examples of the I/O device 206 may include, but are not limited to, a touch screen, a keyboard, a mouse, a joystick, a microphone, gesture sensor, or a display screen.

The network interface 208 may comprise suitable logic, circuitry, interfaces, and/or code that may be configured to facilitate communication between the media processing apparatus 102, the first image capturing device 104A, the first media rendering device 106A and the server 110, via the communication network 112. The network interface 208 may be implemented by use of various known technologies to support wired or wireless communication of the media processing apparatus 102 with the communication network 112. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The motion sensor 210 of the first image capturing device 104A may comprise suitable logic, circuitry, interfaces, and/or code that may be configured to detect movement (linear or angular) of the first image capturing device 104A in three-dimensional (3D) space (such as in X-axis, Y-axis, and Z-axis dimensions). In some embodiments, the motion sensor 210 may be configured to detect orientation, tilt, or acceleration of movement of the first image capturing device 104A. Examples of the motion sensor 210 may include, but are not limited to, a gyroscope based sensor, an accelerometer, a tilt sensor, and/or the like.

The display screen 212 of the first media rendering device 106A may comprise suitable logic, circuitry, interfaces, and/or code that may be configured to display the plurality of image frames 108 (i.e. the first plurality of image frames 108A or the second plurality of image frames 108B). In accordance with an embodiment, the display screen 212 may be configured to display information related to the speed of movement of the first plurality of objects. In some embodiments, the display screen 212 may be an external display device associated with the first media rendering device 106A. The display screen 212 may be a touch screen which may enable the first user 114A to provide a user-input (for example selection of the displayed object) via the display screen 212. The touch screen may be at least one of a resistive touch screen, a capacitive touch screen, or a thermal touch screen. The display screen 212 may be realized through several known technologies such as, but not limited to, at least one of a Liquid Crystal Display (LCD) display, a Light Emitting Diode (LED) display, a plasma display, or an Organic LED (OLED) display technology, or other display devices.

In accordance with an embodiment, the display screen 212 may refer to a display screen of a head mounted device (HMD), a smart-glass device, a see-through display, a projection-based display, an electro-chromic display, or a transparent display. In accordance with an embodiment, the display screen 212 may be included in the media processing apparatus 102, without any deviation from the scope of the disclosure.

Figure 3A:
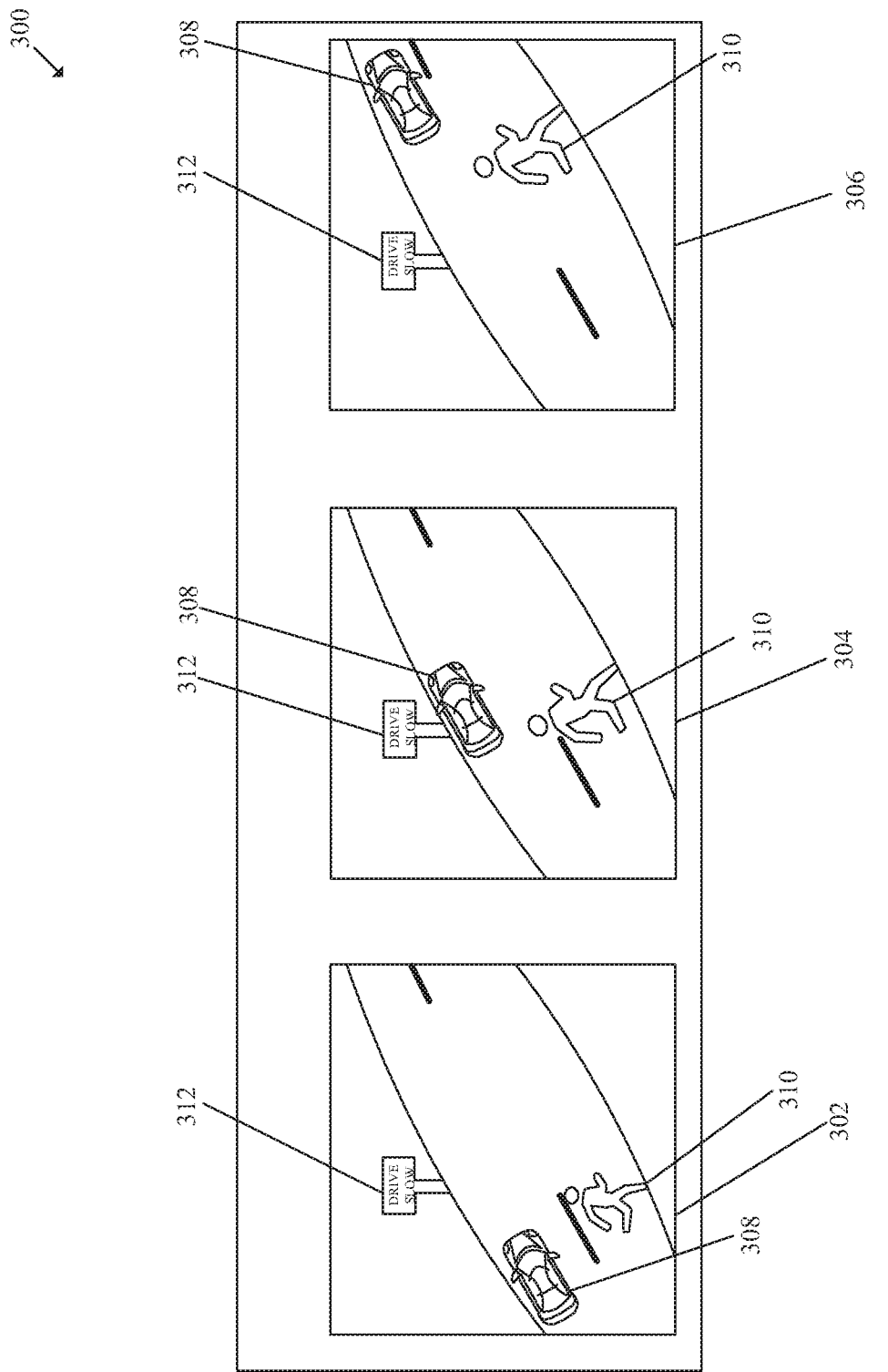
FIGS. 3A and 3B, collectively, illustrate exemplary scenario for determination of speed of movement of an object, in accordance with an embodiment of the disclosure.
Figure 3B:
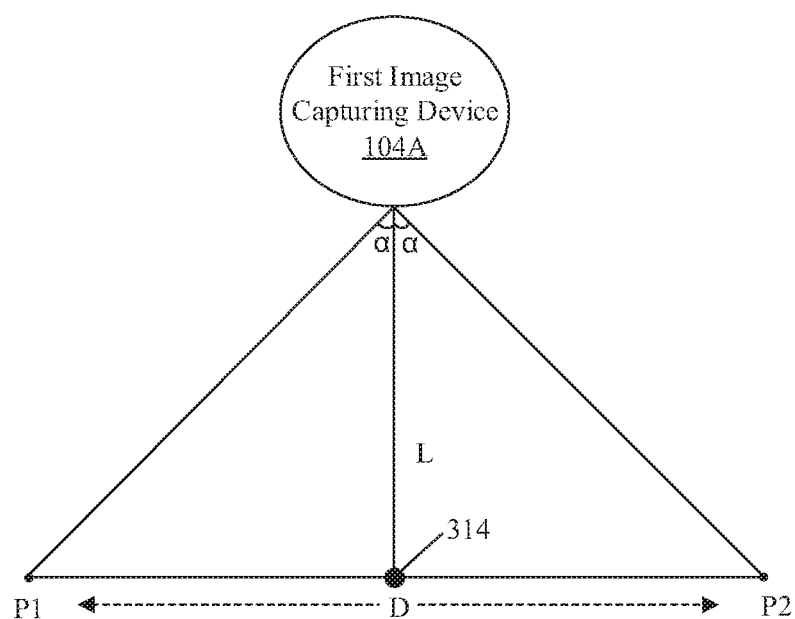

FIGS. 3A and 3B, collectively, illustrate exemplary scenario for determination of speed of movement of an object, in accordance with an embodiment of the disclosure. FIG. 3A is explained in conjunction with elements from FIG. 1 and FIG. 2. With reference to FIG. 3A, there is shown a first set of consecutive image frames 302, 304, and 306 of the first plurality of image frames 108A captured by the first image capturing device 104A over the first time period (say few seconds or minutes) during the preview mode. In some embodiments, the first set of consecutive image frames 302, 304, and 306 may correspond to the second plurality of image frames 108B captured by the first image capturing device 104A during the normal recording mode.

The first set of consecutive image frames 302, 304, and 306 may include the first plurality of objects for example a first object 308, a second object 310, and a third object 312. The first set of consecutive image frames 302, 304, and 306 may be captured from a scene in the FOV of the first image capturing device 104A. For example, the first object 308 (i.e. car) and the second object 310 (i.e. human being) may be the moving objects whose pixel positions may change in the first set of consecutive image frames 302, 304, and 306, while the third object 312 (i.e. a signboard) may be the static object in all of the first set of consecutive image frames 302, 304, and 306. The first set of consecutive image frames may be a set selected from the first plurality of image frames 108A. It should be noted here that the first set of consecutive image frames 302, 304, and 306 and the first plurality of objects shown in FIG. 3A are merely an example and should not be construed as limiting for the scope of the present disclosure.

In accordance with an embodiment, the first plurality of image frames 108A or the first set of consecutive image frames 302, 304, and 306 of the sequence or scene may be captured by the first image capturing device 104A at a default/defined frame rate. The frame rate may refer to a number of individual frames or images captured in a second by the first image capturing device 104A. The default/defined frame rate may be set by the manufacturer of the first image capturing device 104A or by the user associated with the first image capturing device 104A. In some embodiments, the first plurality of image frames 108A may be captured at a defined or default frame rate.

In accordance with an embodiment, the first image capturing device 104A may be configured to transmit the captured first plurality of image frames 108A to the media processing apparatus 102, via the communication network 112. The circuitry 202 of the media processing apparatus 102 may be configured to receive the first plurality of image frames 108A and transmit the received first plurality of image frames 108A to the first media rendering device 106A, via the communication network 112. In some embodiments, the first image capturing device 104A may directly transmit the first plurality of image frames 108A to the first media rendering device 106A. In some embodiments, the circuitry 202 may transmit one of the first set of consecutive image frames 302, 304, and 306 to the first media rendering device 106A. The circuitry 202 may select one image frame from the first set of consecutive image frames 302, 304, and 306 which may include all the moving objects detected from the first set of consecutive image frames 302, 304, and 306 or the first plurality of image frames 108A.

In accordance with an embodiment, the circuitry 202 may be configured to detect or recognize the first object 308, the second object 310, and the third object 312 in the captured first set of consecutive image frames 302, 304 and 306. The circuitry 202 may perform different image processing techniques known in the art to detect or recognize the first object 308, the second object 310, and the third object 312 and output a category or label for each detected object. For example, the media processing apparatus 102 may include a trained neural network (not shown) to recognize or categorize each object included in the captured first plurality of image frames 108A. In accordance with an embodiment, the circuitry 202 may categorize the first object 308, the second object 310, and the third object 312 as the static or the moving object. In some embodiments, the circuitry 202 may determine the objects as static or moving based on change in pixel information of the corresponding objects in the first set of consecutive image frames 302, 304, and 306. In accordance with an embodiment, the circuitry 202 may be configured to transmit the category (for example, but is not limited to, vehicle, human being, or signboard) along with the first plurality of image frames 108A to the first media rendering device 106A.

In some embodiments, the circuitry 202 may be configured to determine a first speed of movement of the plurality of moving objects (for example the first object 308 and the second object 310) present in the first plurality of image frames 108A. The circuitry 202 may be further configured to transmit the first plurality of image frames 108A along with information about the determined first speed of each moving object to the first media rendering device 106A.

The first media rendering device 106A may display the received first plurality of image frames 108A to the first user 114A associated with the first media rendering device 106A via the display screen 212. The first user 114A may provide the user input to the first media rendering device 106A to select one of the displayed moving objects as an object-of-interest. The user selection of the object is described in detail, for example, in FIG. 4. The circuitry 202 of the media processing apparatus 102 may be further configured to receive the user input from the first media rendering device 106A, via the communication network 112. In accordance with an embodiment, the circuitry 202 may only determine the first speed of the movement of the object selected at the first media rendering device 106A.

In accordance with an embodiment, to calculate the first speed of movement of the selected object, the circuitry 202 may be further configured to calculate a vertical distance (represented as "L" in FIG. 3B) between the selected object (such as object 314 in FIG. 3B) and the corresponding image capturing device (example the first image capturing device 104A) which captured the first plurality of image frames 108A including the selected object. In some embodiments, the vertical distance between the selected objects and the first image capturing device 104A may be calculated by the first image capturing device 104A and transmitted to the media processing apparatus 102 for further processing (for example speed calculation). In some embodiments, a distance covered by each of the first plurality of objects or the selected object may be determined based on an equation 1 as follows:

$$D = 2 * L * \tan(\alpha) \quad (1)$$

where L may represent the vertical distance (represented as "L" in FIG. 3B) between an object and an image capturing device, α may represent an angle between FOV extreme points (such as "P1" and "P2" in FIG. 3B) and perpendicular vertical distance to the object 314, where a may be specific to FOV coverage of image capturing device, and D may represent a distance travelled by the object between two points (i.e. represented as "P1" and "P2" in FIG. 3B) in the FOV of the image capturing device.

In accordance with an embodiment, the motion sensor 210 of the first image capturing device 104A may determine or track the movement of the first image capturing device 104A in three-dimensional space (i.e. XYZ directions). For example, the motion sensor 210 may track the movement of the first image capturing device 104A during the first time period in which the first plurality of image frames 108A are captured. In some embodiments, the motion sensor 210 may continuously track the movement of the first image capturing device 104A during preview or normal video recording mode. The first image capturing device 104A may be further configured to transmit the tracked movement as motion information to the media processing apparatus 102. The circuitry 202 may be configured to calculate the vertical distance between the first image capturing device 104A and the object based on the motion information which may indicate the movement of the first image capturing device 104A. Thus, the first image capturing device 104A may be able to accurately calculate the distance travelled by the captured objects based on the reception of the motion information and the vertical distance as indicated in equation (1). The circuitry 202 may identify whether the object is closer or farther from the first image capturing device 104A based on the vertical distance. The circuitry 202 may calculate the vertical distance based on different distance calculation techniques known in the art (for example calculation of distance using infra-red or time-of-flight techniques). In accordance with an embodiment, the circuitry 202 may further determine the first speed of movement of the selected object based on a ratio between the distance travelled by the selected object between two points (as per equation 1) and a time interval between the capture of the selected object at the two points (i.e. "P1" and "P2" in FIG. 3B).

In some embodiments, the circuitry 202 may be configured to determine the first speed of movement of the selected object based on an analysis of the change in the pixel information of the selected object in the first set of consecutive image frames 302, 304, and 306. For example, as shown in FIG. 3B, the first object 308 (i.e. moving car) may change the associated pixel information in each of the first set of consecutive image frames 302, 304, and 306. The circuitry 202 may analyze color information, pixel intensity information (brightness and/or contrast), and/or boundary edges of the selected object in the first set of consecutive image frames 302, 304, and 306 to detect the change in the pixel information. The circuitry 202 may be configured to analyze the change in the pixel information of the first object 308 in each of the first set of consecutive image frames 302, 304, and 306 to determine the first speed of movement of the first object 308 (i.e. moving car). The first object 308 may be the selected object received from the first media rendering device 106A.

In case, when the first image capturing device 104A is in a non-motion state (or stationary state) while capture of the first plurality of image frames 108A, the circuitry 202 may calculate the first speed of movement of the selected object based on the change in the pixel information of the selected object and the vertical distance between the selected object and the first image capturing device 104A. In another case, when the first image capturing device 104A may be in a motion state while capture of the first plurality of image frames 108A, the circuitry 202 may calculate the first speed of movement of the selected object based on the change in the pixel information of the selected object, the vertical distance, and the motion information of the first image capturing device 104A. The first speed of movement of the selected object may be determined in different standard unit for example, kilometer per hour (Kmph), miles per hour (mph), or meters per second (mps).

In accordance with an embodiment, the media processing apparatus 102 may include a machine learning (ML) trained model (not shown) to calculate the first speed of movement of the selected object. The ML trained model may be trained using a training dataset. The training dataset may include a variety of combinations of the vertical distance (i.e. between the first image capturing device 104A and the captured object) and the information about pixel shift within particular frame time (i.e. within the first set of consecutive image frames 302, 304, and 306) of the object to output the corresponding first speed of movement of the object. In accordance with an embodiment, the circuitry 202 may provide the calculated vertical distance and the change in pixel information (i.e. pixel shift) of the object as an input to the ML trained model and the ML trained model may provide the first speed of the object as output (based on the training dataset) to the circuitry 202. Examples of the ML trained model may include, but are not limited to, a deep neural network (DNN), a recurrent neural network (RNN), an artificial neural network (ANN), a convolutional neural network (CNN), a CNN-recurrent neural network (CNN-RNN), R-CNN, Fast R-CNN, Faster R-CNN, a Long Short Term Memory (LSTM) network based RNN, CNN+ANN, LSTM+ANN, a gated recurrent unit (GRU)-based RNN, a Connectionist Temporal Classification (CTC) based RNN, a deep Bayesian neural network, a Generative Adversarial Network (GAN), and/or a combination of such networks.

In accordance with an embodiment, the circuitry 202 may be further configured to calculate a first frame rate for the first image capturing device 104A based on the calculated first speed of movement of the selected object. The circuitry 202 may be configured to calculate the first frame rate from the first speed of the movement of the selected object (for example first object 308) using a look-up table stored in the memory 204 of the media processing apparatus 102. The look-up table may indicate a relationship between various speeds of movement and corresponding frame rates to capture images or video.

Examples of the look-up table which may indicate a relationship between speed of object and frame rate for capture is presented in Table 1, as follows:

TABLE 1

Lookup-Table for frame rate calculation

| Speed (in Kmph) | Frame rate of capture (in fps) |
| --- | --- |
| >=5 Kmph | 30 fps |
| >=7 Kmph | 60 fps |
| >=9 Kmph | 100 fps |

In accordance with an embodiment, the circuitry 202 may extract the first frame rate from the look-up table (Table 1) corresponding to the calculated first speed of movement of objects to calculate the first frame rate for the first image capturing device 104A. For example, if the determined first speed of movement is greater than or equal to 5 Kmph then the first frame rate for the first image capturing device 104A may be 30 fps. In another example, if the determined speed is greater than or equal to 7 Kmph then the first frame rate may be 60 fps as shown in Table 1. In some embodiments, if the determined first speed is in a metric unit (like mph) which may be different from the stored values in Table 1, the circuitry 202 may convert the determined first speed into different metric unit (for example mph to Kmph or vice-versa) and accordingly determine the first frame rate for the first image capturing device 104A.

In accordance with an embodiment, the circuitry 202 may calculate the first frame rate based on the determined first speed of movement of the selected object and the change in the pixel information or pixel shift of the selected object in the first set of consecutive image frames 302, 304 and 306. For example, the circuitry 202 may determine the pixel shift of the selected moving object or the movement of the selected object in consecutive image frames in different distance metric (for example millimeters, centimeter, or inches). In accordance with an embodiment, the lookup-table stored in the memory 204 may indicate a relationship between the first speed of movement, change in the pixel information of objects (or object movement), and the first frame rate for the first image capturing device 104A to capture images or video as shown in Table 2.

Examples of the look-up table which may indicate a relationship between speed of object, change in pixel information, and frame rate for capture is presented in Table 2, as follows:

TABLE 2

Lookup-Table for frame rate calculation

| Speed of Object (Km/hr) | Object movement or change in pixel per frame (inches/frame) | Frame rate for capture (fps) |
| --- | --- | --- |
| 10 Kmph | 0.36 | 30 fps |
|  | 0.18 | 60 fps |
| 20 Kmph | 0.72 | 30 fps |
|  | 0.36 | 60 fps |
|  | 0.18 | 120 fps |

In accordance with an embodiment, the circuitry 202 may be configured to compare information about the speed of object and change in pixel stored in the look-up table of Table 2 with the determined first speed of movement of the selected object and the change in the pixel information of the selected object to extract/calculate the first frame rate from the look-up table of Table 2.

In accordance with an embodiment, the calculated first frame rate may be utilized by the first image capturing device 104A to capture the second plurality of image frames 108B (different from the first plurality of image frames 108A). The circuitry 202 may be configured to transmit the calculated first frame rate to the first image capturing device 104A to capture the second plurality of image frames 108B. In some embodiments, the circuitry 202 may transmit some instructions to the first image capturing device 104A to change the default/defined frame rate (in which first plurality of image frames 108A are captured) to the calculated first frame rate to capture the second plurality of image frames 108B (say in video recording mode). The second plurality of image frames 108B may form a media or video content. Thus, the circuitry 202 may control the first image capturing device 104A to capture the second plurality of image frames 108B (or video) to dynamically change the capture frame rate based on the first speed of the movement of the selected object.

In some embodiments, the instructions may include a time period for which the default/defined should be changed to the calculated first frame rate. After the time period, the first image capturing device 104A may be configured to change the first frame rate of the first image capturing device 104A to the default/defined frame rate set by the user or the manufacturer of the first image capturing device 104A. In some embodiments, the calculated first frame rate may be set as the default frame rate of the first image capturing device 104A for future media capture. In another embodiment, in case, the calculated first frame rate is lesser than the default/defined frame rate of the first media rendering device 106A, the circuitry 202 may control the first image capturing device 104A to capture the second plurality of image frames 108B at the default/defined frame rate.

In accordance with an embodiment, the circuitry 202 may be configured to receive the captured second plurality of image frames 108B on run-time basis (i.e. online capture) from the first image capturing device 104A. The circuitry 202 may further transmit the received second plurality of image frames 108B to one or more of the plurality of media rendering devices 106. Thus, the plurality of media rendering devices 106 may receive the captured second plurality of image frames 108B as an online or a live video.

Figure 4:
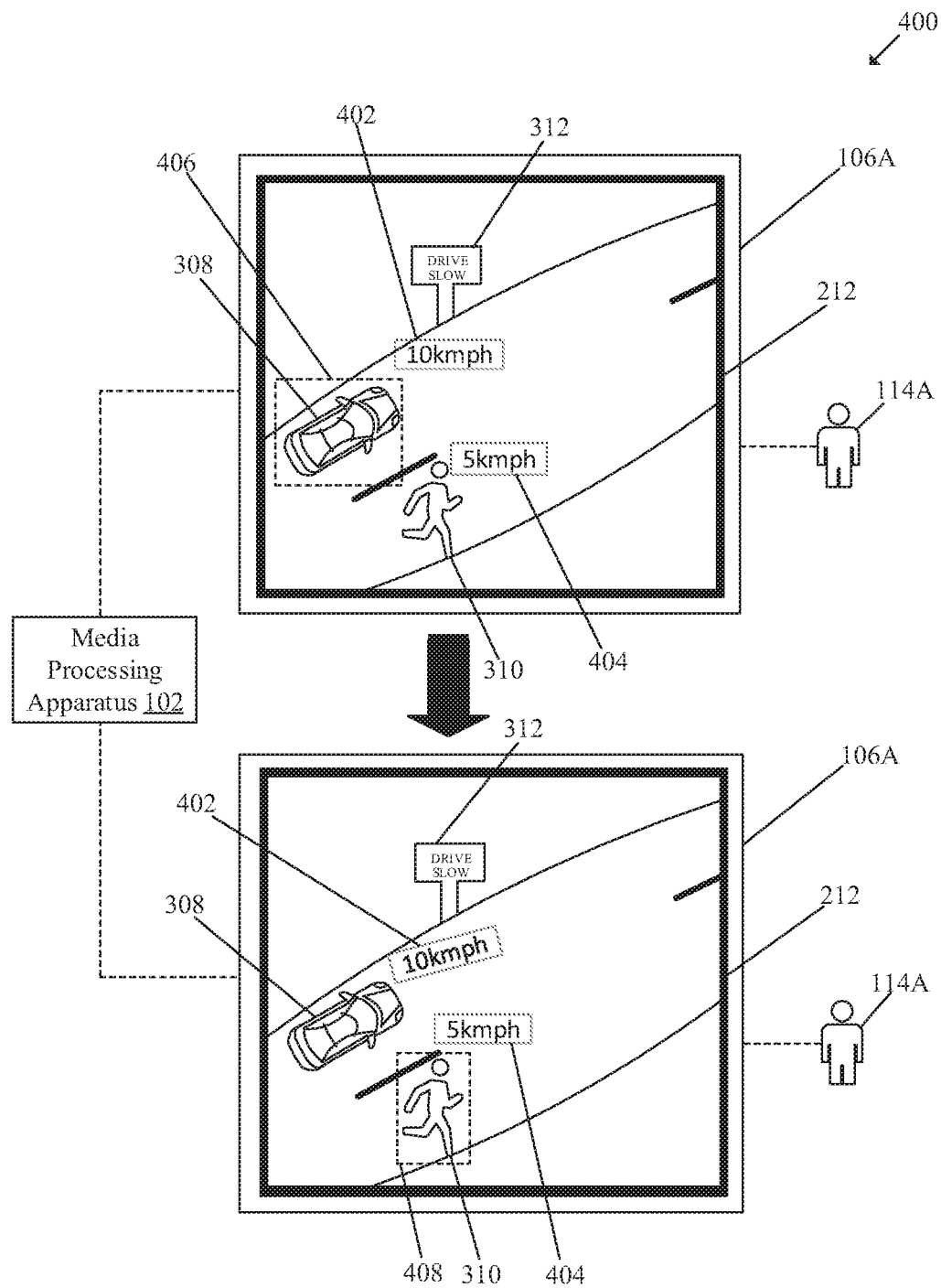
FIG. 4 illustrates exemplary scenario for selection of objects by a media rendering device for frame rate control for media capture, in accordance with an embodiment of the disclosure.

FIG. 4 illustrates exemplary scenario for selection of objects by a media rendering device for frame rate control for media capture, in accordance with an embodiment of the disclosure. FIG. 4 is explained in conjunction with elements from FIG. 1, FIG. 2, FIG. 3A and FIG. 3B. With reference to FIG. 4, there is shown an exemplary scenario 400 for one of the plurality of media rendering devices 106 (for example the first media rendering device 106A).

In the exemplary scenario 400, there is shown the first media rendering device 106A of the plurality of media rendering devices 106. The first media rendering device 106A may include a display screen 212. The first media rendering device 106A may be configured to receive the first plurality of image frames 108A from the media processing apparatus 102. In some embodiments, the first media rendering device 106A may be configured to receive the first plurality of image frames 108A from the first image capturing device 104A or the server 110. The first plurality of image frames 108A may consist of the first set of consecutive image frames 302, 304 and 306. The consecutive image frames 302, 304 and 306 of the first object 308 (i.e. moving car), the second object 310 (i.e. moving human being), and the third object 312 (i.e. stationary signboard) are described in FIG. 3A.

The first media rendering device 106A may be further configured to display the received first plurality of image frames 108A to the first user 114A associated with the first media rendering device 106A, via the display screen 212. In some embodiments, the first media rendering device 106A may display one image frame from the first plurality of image frames 108A. The one image frame may be selected so that one or more of the moving objects captured in the first plurality of image frames 108A may be displayed, via the display screen 212. In some embodiments, the first media rendering device 106A may receive and display the second plurality of image frames 108B including either the first plurality of objects or a second plurality of objects (may be different from the first plurality of objects).

In some embodiments, the first media rendering device 106A may also display speed information along with the moving objects. The speed information may indicate the determined speed of movement of the moving objects. The circuitry 202 of the media processing apparatus 102 may be configured to determine the speed of movement of each of the moving objects detected in the plurality of image frames 108 and generate the speed information for each detected moving object.

In accordance with an embodiment, the first media rendering device 106A may receive the speed information for each of the moving objects (for example the first object 308 and the second object 310) from the media processing apparatus 102 or the first image capturing device 104A. In such case, the circuitry 202 of the media processing apparatus 102 may be configured to determine the speed information for each of a set of moving objects in the first plurality of objects. In FIG. 4, there is further shown a first icon 402 which may indicate the speed information (for example 10 Kmph) of the first object 308 (i.e. moving car) and a second icon 404 which may indicate the speed information (for example 5 Kmph) of the second object 310 (i.e. moving human being). In some embodiments, the first media rendering device 106A may display object icons (not shown) and object identification information (for example object category or object name) for each the moving objects rather than using actual image of the moving object. The first media rendering device 106A may receive the object identification information for the moving objects (for example the first object 308 and the second object 310) from the media processing apparatus 102 along with the plurality of image frames 108. In some embodiments, the object identification information may include corresponding icons (for example the first icon 402 and the second icon 404) for the moving objects. In some embodiments, a list, icons, or thumbnails of the plurality of objects may be presented to the first user 114A during or after the playback of the first plurality of image frames 108A. The first user 114A may select the first object 308 from the list, icons, or thumbnails of the plurality of objects displayed on the display screen 212.

The first media rendering device 106A may be further configured to receive a first user input during the playback of the first plurality of image frames 108A or may be during the playback of the second plurality of image frames 108B. The first user input may correspond to a selection 406 of the first object 308. In some embodiments, the first user input may correspond to the selection of only moving objects (as the set of objects) from the plurality of objects. The first user 114A may select the first object 308 from the first plurality of image frames 108A being rendered on the display screen 212 of the first media rendering device 106A. The first user input may be based on, but is not limited to, a touch input, a click input, a hand gesture, or an eye gaze. The first media rendering device 106A may include a camera (for example) to track the hand gesture or eye gaze of the first user 114A to receive the first user input to select the first object 308. In some embodiments, the first media rendering device 106A may automatically track an eye movement or blink of the first user 114A to determine the selection of the first object 308 on which the first user 114A may be interested or focused. In such case, the first object 308 may be considered as the selected object for further frame rate adjustment as described in FIG. 3A.

The first media rendering device 106A may be further configured to transmit the received first user input to the media processing apparatus 102. In some embodiments, the first media rendering device 106A may transmit the first user input (information about the selected object) to the first image capturing device 104A or the server 110. In accordance with an embodiment, the first media rendering device 106A may be further configured to transmit display characteristics information of the first media rendering device 106A along with the first user input to the media processing apparatus 102. The display characteristics information may include a display size, a display frame/refresh rate, a pixel per inch information of the first media rendering device 106A. The display characteristics information may indicate the display frame rate capability of the first media rendering device 106A or display frame rate supported by the first media rendering device 106A. In some embodiments, the media processing apparatus 102 may directly extract the display characteristics information of the first media rendering device 106A from the server 110.

In accordance with an embodiment, the media processing apparatus 102 may be configured to receive the first user input (including the first object 308 as the selected object) and the display characteristics information from the first media rendering device 106A. The media processing apparatus 102 may determine the speed of movement of the first object 308 and calculate the first frame rate based on the speed of movement of the first object 308 as described, for example, in FIG. 3B and Tables 1-2. The calculated first frame rate may be used by the first image capturing device 104A to capture further images or video (i.e. the second plurality of image frames 108B) which may be further displayed on the display screen 212 of the first media rendering device 106A for further selections of moving objects.

In some embodiments, the circuitry 202 of the media processing apparatus 102 may calculate the first frame rate based on the display characteristics information. In case, the calculated first frame rate is greater than the display frame rate supported by the first media rendering device 106A, the media processing apparatus 102 may reduce or downscale the first frame rate to match the display frame rate supported by the first media rendering device 106A. In another embodiment, in case the calculated frame rate is lesser than the display frame rate, the circuitry 202 may increase or upscale the first frame rate to match the display frame rate supported by the first media rendering device 106A. Thus, the disclosed media processing apparatus 102 may adapt the calculated first frame rate based on both the speed of movement of the selected object and the display frame rate capability of the first media rendering device 106A. This may further avoid unwanted utilization of resources (for example CPU, memory, network bandwidth utilization) to downscale or upscale the first frame rate at the end of the first media rendering device 106A, and seamlessly render the media received from the media processing apparatus 102. This may further provide an enhanced viewing experience to the first user 114A associated with the first media rendering device 106A.

For example, if the selected object is the first object 308 (i.e. moving car as the object of interest), the media processing apparatus 102 may determine the speed of movement of the first object 308 (say 10 Kmph) and calculate the first frame rate as 100 fps (frames per second) as per Tables 1-2. Further, in case, the display frame rate supported by the first media rendering device 106A is 60 fps, then the media processing apparatus 102 may downscale the calculated first frame rate from 100 fps to 60 fps and further control the first image capturing device 104A to capture the second plurality of image frames 108B at 60 fps frame rate such that the first media rendering device 106A may easily render the captured second plurality of image frames 108B. In another embodiment, the circuitry 202 of the media processing apparatus 102 may continue the capture of the second plurality of image frames 108B at 100 fps and record the captured second plurality of image frames 108B in the memory 204, and concurrently downscale (i.e. reduce frame rate) the second plurality of image frames 108B at 60 fps before transmission to the first media rendering device 106A.

In another embodiment, if the calculated first frame rate is equal to the display frame rate of the first media rendering device 106A, the media processing apparatus 102 may control the first image capturing device 104A to capture the second plurality of image frames 108B at the calculated frame rate. In some embodiments, in case no object is selected, the circuitry 202 of the media processing apparatus 102 may be configured to calculate speed of movement of each moving object of the first plurality of objects detected from the first plurality of image frames 108A and calculate an average speed movement of the currently moving objects and calculate the first frame rate based on the average of the speed of movement of the set of moving objects.

In accordance with an embodiment, the first image capturing device 104A may further capture the second plurality of image frames 108B (say at the video recording mode) at the calculated first frame rate and transmit the captured second plurality of image frames 108B to the media processing apparatus 102. The media processing apparatus 102 may be further configured to transmit the received second plurality of image frames 108B to the first media rendering device 106A or all of the plurality of media rendering devices 106. The second plurality of image frames 108B may be displayed to the first user 114A via the display screen 212. The first media rendering device 106A may be further configured to receive a second user input from the first user 114A of the first media rendering device 106A. The second user input may correspond to a selection 408 of the second object 31 (moving car) as shown in FIG. 4. The first media rendering device 106A may further transmit the second user input to the media processing apparatus 102. In response, the receipt of the second user input, the circuitry 202 of the media processing apparatus 102 may determine the second speed of movement of the second object 310 and calculate a second frame rate to capture a third plurality of image frames (not shown) in continuation to the capture of the second plurality of image frames 108B. The calculated second frame rate may be different from the calculated first frame rate. For example, in case the second frame rate (for example 100 fps) is higher than the first frame rate (say 60 fps), the circuitry 202 may control the first image capturing device 104A to change or switch to the second frame rate and capture/record the third plurality of image frames at the higher frame rate as 100 fps.

In some embodiments, during the capture of the second plurality of image frames 108B (i.e. recording mode), the circuitry 202 may continuously calculate an average of the speed of the set of moving objects present in the current set of image frames (i.e. second plurality of image frames 108B) and continue the capture at the first frame rate which may be calculated based on the average speed of the set of objects.

In accordance with an embodiment, the circuitry 202 of the media processing apparatus 102 may receive the second user input from a second media rendering device 106B which may be different from the first media rendering device 106A. The second user input may either correspond to the second object 310 or a different moving object render on a display screen of the second media rendering device 106B. The second media rendering device 106B may receive the second user input from an associated second user 114B while the display of the second plurality of image frames 108B. In some embodiments, the second media rendering device 106B may receive the second user input from the second user 1148 while the first plurality of image frames 108A are displayed. The circuitry 202 of the media processing apparatus 102 may further determine the second speed of movement of the moving object indicated by the second user input and calculate the second frame rate corresponding to the moving object indicated by the second object with the same process as described in detail, for example, in FIG. 3A. The second speed of movement may be determined based on the analysis of the first set of consecutive image frames or based on an analysis of a second set of consecutive image frames of the first plurality of image frames 108A (captured during preview mode) as described in detail, for example, in FIG. 3A. The second set of consecutive image frames may include the second object 310 for which the second speed of movement is calculated. In some embodiments, the second set of consecutive image frames may be part of the second plurality of image frames 108B (captured during recording mode).

In some embodiments, the circuitry 202 may be further configured to compare the calculated first frame rate and the calculated second frame rate and choose maximum frame rate (maximum among the first frame rate and the second frame rate) as a best frame rate to control the first image capturing device 104A to capture further images or videos (i.e. the second plurality of image frames 108B). Thus, the circuitry 202 may be configured to calculate the frame rate based on the determined first speed of movement of the first object 308 and determined second speed of movement of the second object 310.

For example, in case, the speed of movement of the first object 308 is 10 Kmph and the speed of movement of the second object 310 is 5 Kmph as shown in FIG. 4, the calculated first frame rate and the second frame rate may be 100 fps and the 30 fps respectively as per Table 1. In such case, the circuitry 202 of the media processing apparatus 102 may select 100 fps as the best frame rate to further capture the second plurality of image frames 108B. The circuitry 202 may be further configured to generate a first video file (which includes the second plurality of image frames 108B) based on the calculated first frame rate (i.e. 100 fps corresponding to the first object 308). The circuitry 202 may further transmit the generated first video file to each of the first media rendering device 106A or the second media rendering device 106B.

In some embodiments, the circuitry 202 may update the generated first video file (at 100 fps) or generate a second video file at the frame rate of 30 fps for the second media rendering device 106B from which the selection of the second object 310 is received as the second user input. The circuitry 202 may be configured to update (i.e. downscale) the frame rate of the first video file to generate the second video file. The circuitry 202 may be further configured to transmit or stream the updated first video file or the generated second video file to the second media rendering device 106B or other plurality of media rendering devices 106 based on the received user inputs.

In accordance with an embodiment, the circuitry 202 of the media processing apparatus 102 may detect whether the moving object (based on which current frame rate is calculated) is out-of-frame or not in the current FOV of the first image capturing device 104A. For example, at the time of capture of the second plurality of image frames 108B based on the speed of the first object 308, the circuitry 202 may continuously detect whether the first object 308 is out-of-frame or absent in a second set of consecutive image frames in the second plurality of image frames 108B. In case of determination that the first object is out-of-frame, the circuitry 202 may again calculate the first frame rate based on the determination that the first object 308 is out-of-frame or absent in the second set of consecutive image frames. The circuitry 202 or the first image capturing device 104A may further continue with the capture of the second plurality of image frames based on one of a plurality of recording settings stored in the memory 204.

For example, based on a first recording setting of the plurality of recording settings, the circuitry 202 may further control the first image capturing device 104A to continue the capture of the second plurality of image frames 108B at the current first frame rate (i.e. calculated based on speed of the first object 308). In another embodiment, based on a second recording setting of the plurality of recording settings, the circuitry 202 may be configured to receive information about selection of a new moving object (for example the second object 310) from the first media rendering device 106A or the second media rendering device 106B. The received information may correspond to the second user input which may indicate the selection of the new moving object (for example the second object 310). The circuitry 202 may be configured to calculate the frame rate (or new frame rate) based on the speed of movement of the new moving object (for example the second object 310). The media processing apparatus 102 may be further configured to control the first image capturing device 104A to continue capture of the second plurality of image frames 108B at the new frame rate. In some embodiments, the first image capturing device 104A may continue with the current frame rate until the second user input may be received which may indicate the newly selected moving object from one of the plurality of media rendering devices 106.

In another embodiment, based on a third recording setting of the plurality of recording settings, the circuitry 202 of the media processing apparatus 102 may determine an average of speed of movement of all the moving objects (i.e. a set of objects from all the detected objects in the current image frame) and calculate an average frame rate (as an optimal frame rate) based on the calculated average speed of movement of all the moving objects. For example, in case the set of objects includes two objects with the speed of movement as 5 Kmph and 9 Kmph respectively. The circuitry 202 may calculate the average of the speed of movement as 7 Kmph and calculate average frame as 60 fps based on the average of speed of movement of the two objects. The circuitry 202 may be further configured to control the first image capturing device 104A to continue capture of the second plurality of image frames 108B at the average frame rate. In some embodiments, the circuitry 202 may calculate the average frame rate in case, multiple moving objects are selected by plurality of media rendering devices in a particular period of time (say within few seconds or image frames).

In some embodiments, the circuitry 202 may select one of the first recording setting, the second recording setting, or the third recording setting based on a user setting defined in the memory 204. For example, in case of the second recording setting as the stored user setting, the circuitry 202 may send a notification to the first media rendering device 106A (or the plurality of media rendering devices 106) that the first object 308 is out-of-frame or absent, and request for the second user input about the selection of the new object (i.e. the second object 310). The circuitry 202 may further wait for the second user input for a defined time period (for example few seconds) after the notification and configure to one of the first recording setting (i.e. continue with current frame rate) or the third recording setting (i.e. calculate average frame rate) based on the lapse of the defined time period.

In accordance with an embodiment, the media processing apparatus 102 may be further configured to receive a user input to end the recording of the media or video. The user input may be received from a user associated with the media processing apparatus 102. In response to the user input, the media processing apparatus 102 may be configured to perform a post-processing process on the captured or recorded plurality of image frames 108. In the post-processing process, the circuitry 202 of the media processing apparatus 102 may be configured to upscale the frame rate of the first plurality of image frame 108A which may be captured in the preview mode at the default frame rate, in case the default frame rate is lower than the first frame rate. For example, in case the default frame rate is 30 fps, and the calculated first frame rate is 100 fps at which the second plurality of image frames 108B are captured or recorded, then the circuitry 202 may upscale the frame rate of the first plurality of image frame 108A to 100 fps and generate a first media file. Similarly, in case, the first frame rate calculated based on the selected first object 308 is 15 fps which is lower than the default frame rate, then the circuitry 202 may downscale the frame rate of the first plurality of image frame 108A to 15 fps and generate the first media file (i.e. first sequence) which may include the updated (upscaled or downscaled) first plurality of image frames 108A.

In accordance with an embodiment, the circuitry 202 media processing apparatus 102 may be further configured to generate a second media file (i.e. second sequence) which may include the second plurality of image frame 108B captured at the first frame rate calculated based on the selected first object 308. The circuitry 202 may further generate an output media file based on the combination of the first media file and the second media file, where total duration of the output media file may a sum of duration (i.e. the first time period) of the first media file (i.e. recorded in the preview mode) and a duration (i.e. the second time period) of the second media file (i.e. recorded in the recording mode). Thus, in case of multiple selections of moving objects during the recording mode, the circuitry 202 of the media processing apparatus 102 may be configured to dynamically adjust the frame rates based on the speed of movement of the selected moving objects and generate multiple media files during the recording where each media file may be recorded based on a particular value of the frame rate. The particular value of the frame rate may be, but is not limited to, the current frame rate associated with selected object, maximum frame rate among multiple frame rates of selected objects, default frame rate, or average frame rate of multiple moving objects. In some embodiments, the circuitry 202 may generate the multiple media files in response a detection of change in the speed of the selected objects during the recording. At the end of recording, the circuitry 202 may be configured to adjust (upscale or downscale) the frame rate of different recorded media files to generate one output media file.

Figure 5:
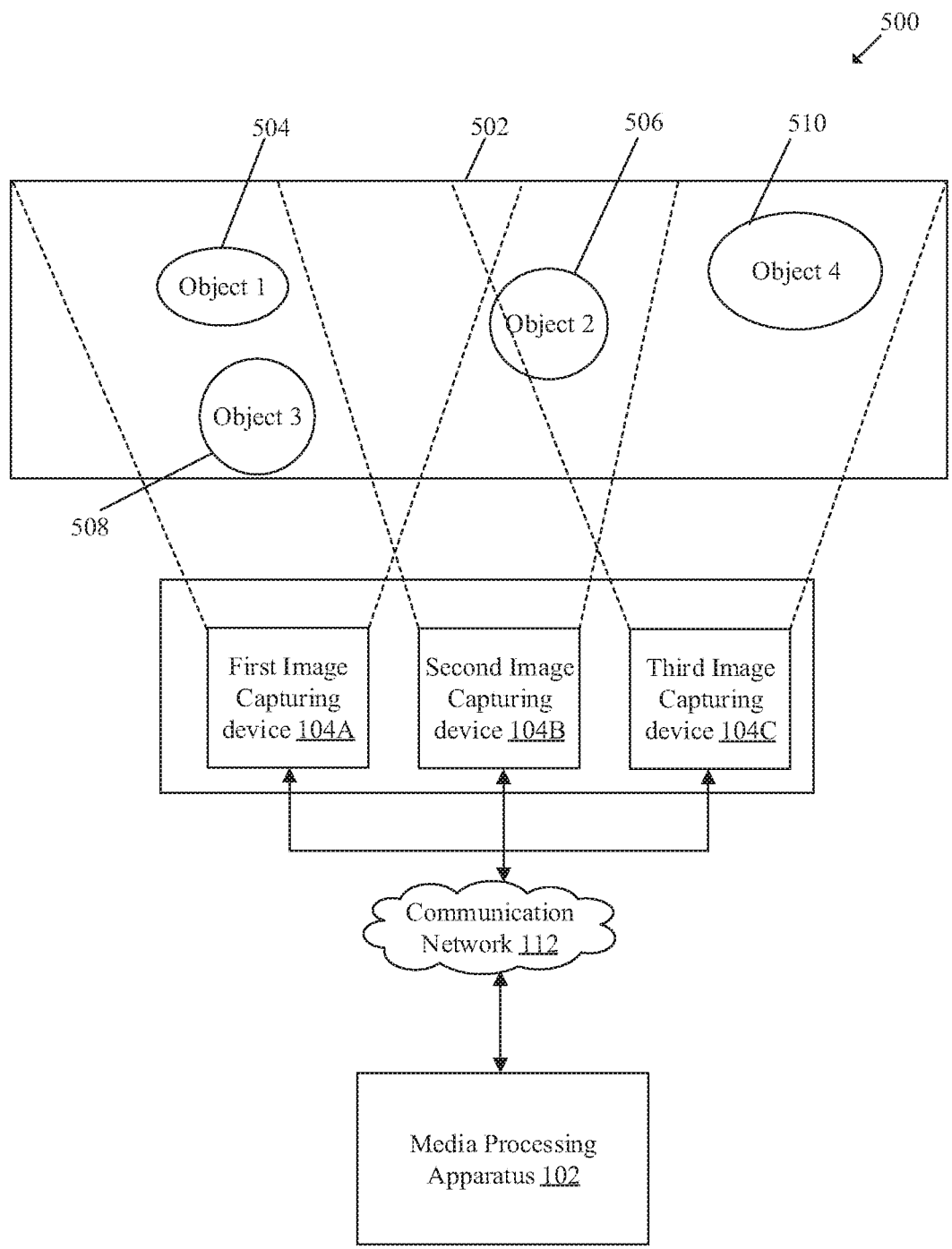
FIG. 5 illustrates exemplary scenario to control a plurality of image capturing devices by media processing apparatus of FIG. 2, in accordance with an embodiment of the disclosure.

FIG. 5 illustrates exemplary scenario to control a plurality of image capturing devices by media processing apparatus of FIG. 2, in accordance with an embodiment of the disclosure. FIG. 5 is explained in conjunction with elements from FIG. 1, FIG. 2, FIG. 3A, FIG. 3B, and FIG. 4. With reference to FIG. 5, there is shown a scenario 500.

In the scenario 500, there is shown the plurality of image capturing devices 104 which may include a first image capturing device 104A, a second image capturing device 104B and a third image capturing device 104C. The plurality of image capturing devices 104 may capture a scene 502 in the field of view (FOV) of the plurality of image capturing devices 104. The FOV of the plurality of image capturing devices 104 may include a first object 504, a second object 506, a third object 508, and a fourth object 510 present in the scene 502. In FIG. 5, the FOV or a capture angle of each of the plurality of image capturing devices 104 is shown by dotted lines. The first image capturing device 104A may have a first field of view (FOV) and the second image capturing device 104B may have a second field of view (FOV) that may be different from the first field of view (FOV) of the first image capturing device 104A. In some embodiments, field of views or capture angles of the plurality of image capturing devices 104 may overlap with each other (as shown for the second image capturing device 104B and the third image capturing device 104C in FIG. 5).

In accordance with an embodiment, the plurality of image capturing devices 104 may be positioned at different locations or with orientations to capture the same scene 502 with different field of views or at different capture angles. In some embodiments, the plurality of image capturing devices 104 may be positioned in such a way that images captured by one or more of the plurality of image capturing devices 104 may combined to create a free-view or 360-degree view or a panoramic view of the scene 502. In accordance with an embodiment, each of the plurality of image capturing devices 104 may be configured to transmit the captured image frames to the media processing apparatus 102, via the communication network 112. The media processing apparatus 102 may be further configured to stitch the image frames captured by each of the plurality of image capturing devices 104 to generate the first plurality of image frames 108A or the second plurality of image frames 108B of the scene 502.

In some embodiments, the first image capturing device 104A may be configured to capture the first plurality of image frames 108A (in preview mode) or the second plurality of image frames (in normal recording mode) of the scene 502 and further transmit the captured first plurality of image frames 108A or the second plurality of image frames 108B to the media processing apparatus 102. The circuitry 202 of the media processing apparatus 102 may receive the first user input corresponding to the selection of a moving object (for example the first object 308). The process of receipt of the first user input corresponding to the selection of the moving object is described in detail, for example, in FIG. 4. The circuitry 202 may be further configured to determine the speed of movement of the selected object and calculate the first frame rate as described in detail, for example, in FIG. 3.

In accordance with an embodiment, the circuitry 202 of the media processing apparatus 102 may transmit the calculated first frame rate to the first image capturing device 104A. In some embodiments, the circuitry 202 may be configured to transmit the calculated first frame rate to each image capturing device of the plurality of image capturing devices 104 so that all the plurality of image capturing devices 104 may be synchronized with each other and capture the second plurality of image frames 108B (or future image frames) at the calculated first frame rate. Thus, during live streaming of the second plurality of image frames 108B, a frame rate calculated based on an object associated with one image capturing device may be communicated to other image capturing devices so that each of the image capturing device records the video at the same frame rate and provide synchronized video rendering at the plurality of media rendering devices 106.

In some embodiments, the circuitry 202 may calculate the first frame rate based on the average speed of movement of all the moving objects captured by the plurality of image capturing devices 104, in case the user input is not received from any of the media rendering devices 106. The circuitry 202 may be further configured to transmit the first frame rate (calculated based on the average speed) to the plurality of image capturing devices 104 to capture the second plurality of image frames 108B at the calculated first frame rate.

In some embodiments, the circuitry 202 of the media processing apparatus 102 may receive a plurality of user inputs (for example in case of live video streaming to multiple media rendering devices) from the plurality media rendering devices 106. Each of the plurality of user inputs may correspond to a different object from the plurality of objects present in the scene 502. In some embodiments, plurality of user inputs may correspond to a same moving object.

For example, as shown in FIG. 5, the first image capturing device 104A (with first FOV) may capture the first plurality of image frames 108A which may include the first object 504 and the second image capturing device 104B (with second FOV) may capture a third plurality of image frames. The third plurality of image frames may include a second plurality of objects which may include the second object 506 as shown in FIG. 5. The circuitry 202 of the media processing apparatus 102 may be configured to stitch the first plurality of image frames 108A (or the second plurality of image frames 108B) received from the first image capturing device 104A and the third plurality of image frames (not shown) received from the second image capturing device 104B and the transmit the stitched image frames to the plurality of media rendering devices 106. In accordance with an embodiment, the circuitry 202 may receive the first user input about the selection of the first object 504 from the first media rendering device 106A and calculate the first frame rate based on the speed of movement of the first object 504 as per the process described in detail, for example in FIGS. 3A-3B and Tables 1-2.

The circuitry 202 may be further configured to receive the second user input about the selection of the second object 506 from the second media rendering device 106B. In some embodiments, the circuitry 202 may receive the second user input from the first media rendering device 106A as all the plurality of media rendering devices 106 received the stitched image frames from the media processing apparatus 102. The circuitry 202 may be further configured to calculate the second speed of movement of the second object 506 based on the analysis of the consecutive image frames which may include the second object 506 and calculate the second frame rate based on the second speed of movement of the second object 506. In some embodiments, the circuitry 202 may determine a maximum frame rate among the first frame rate and the second frame rate and transmit the maximum frame rate to each of the plurality of image capturing devices 104 for further capture of image frames. In another embodiment, the circuitry 202 may determine the average frame rate of the first frame rate and the second frame rate and transmit the average frame rate to each of the plurality of image capturing devices 104 for further capture of the second plurality of image frames 108B or upcoming image frames in synchronization.

Figure 6:
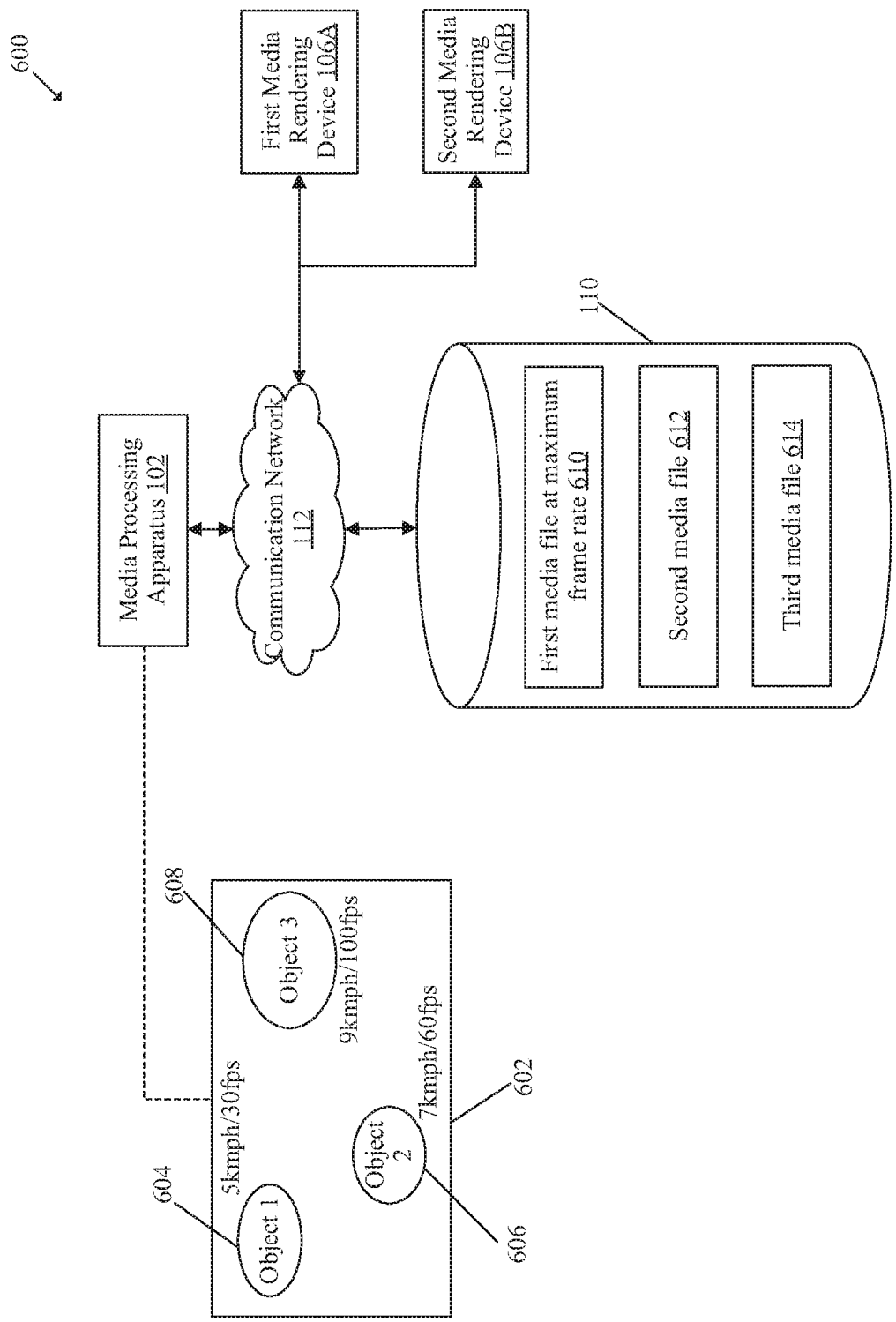
FIG. 6 illustrates a block diagram for generation of a plurality of media files at different frame rates for a plurality of media rendering devices, in accordance with an embodiment of the disclosure.

FIG. 6 illustrates a block diagram for generation of a plurality of media files at different frame rates for a plurality of media rendering devices, in accordance with an embodiment of the disclosure. FIG. 6 is explained in conjunction with elements from FIG. 1, FIG. 2, FIG. 3A, FIG. 3B, FIG. 4, and FIG. 5. With respect to FIG. 6, there is shown the media processing apparatus 102 which may capture a scene 602. The scene 602 may include a first object 604, a second object 606, and a third object 608 which may be included as the moving objects in the plurality of image frames 108 captured by the first image capturing device 104A (not shown in FIG. 6). The circuitry 202 of the media processing apparatus 102 may be configured to determine the speed of movement of each of the first object 604, the second object 606, and the third object 608, for example, as 5 Kmph, 7 Kmph, and 9 Kmph respectively, as shown in FIG. 3A.

In accordance with an embodiment, the circuitry 202 may determine a frame rate for each of the detected first object 604, the second object 606, and the third object 608 (for example as 30 fps, 60 fps, and 100 fps, respectively) as per the process described in detail in FIGS. 3A-3B and Tables 1-2. In an online or live streaming mode, the circuitry 202 may be configured to capture or record the plurality of image frames 108 at a maximum or highest frame rate (i.e. among the frame rates of all detected moving objects). For example, as per FIG. 6, the media processing apparatus 102 may capture the plurality of image frames 108 at a frame rate of 100 fps. The circuitry 202 may generate a first media file 610 which may include the plurality of image frames 108 captured at the highest frame rate (for example at 100 fps) as per FIG. 6. The highest frame rate may be a frame rate supported by the first image capturing device 104A or the plurality of image capturing devices 104.

In accordance with an embodiment, the circuitry 202 may also record or generate a plurality of media files (including the first media file 610) where each media file may be generated based on the corresponding frame rate of each moving object in the scene 602. For example, the circuitry 202 may generate a second media file 612 at the frame rate of 30 fps corresponding to the first object 604. In some embodiments, the circuitry 202 may update (i.e. downscale) the plurality of image frames 108 (or the first media file 610) captured at the highest frame rate to generate the second media file 612. In other words, the circuitry 202 may downscale the first media file 610 to 30 fps for generation of the second media file 612. The circuitry may be configured to drop one or more image frames (say per second) from the plurality of image frames 108 (or the first media file 610) to downscale the frame rate of the first media file 610.

Similarly, the circuitry 202 may generate a third media file 614 at the frame rate of 60 fps corresponding to the second object 606. The circuitry 202 may update (i.e. downscale) the plurality of image frames 108 (or first media file 610) captured at the highest frame rate to generate the third media file 614 at the frame rate of 60 fps. In some embodiments, the circuitry 202 may be configured to upscale the frame rate of the first media file 610 to generate the second media file 612 and the third media file 614, in case the first media file 610 is produced at lower frame rate than the corresponding frame rates of the first object 604 and the second object 606 based on a predefined setting or user preference.

In accordance with an embodiment, the circuitry 202 may be further configured to store each of the plurality of media files in the memory 204 or the server 110, as shown in FIG. 6, for the online or live streaming to the plurality of media rendering devices 106. The circuitry 202 may be further configured to extract or select a corresponding media file from the plurality of media files stored on the server 110 and transmit the extracted media file to a particular media rendering device based on the selection of a moving object by the particular media rendering device or based on the display frame rate capability of the particular media rendering device.

For example, in case the first media rendering device 106A selects the first object 604 (i.e. moving at speed 5 Kmph) when rendered on the display screen 212, the circuitry 202 of the media processing apparatus 102 may extract or select the second media file 612 from the server 110 or the memory 204. The second media file 612 may be generated at the frame rate (30 fps) corresponding to the speed of movement of the first object 604. The circuitry 202 may further transmit the extracted the second media file 612 to the first media rendering device 106A from which the selection of the first object 604 is received.

In another example, in case the second media rendering device 106B selects the second object 606 (i.e. moving at speed 7 Kmph) when rendered on the display screen 212, the circuitry 202 of the media processing apparatus 102 may extract the third media file 614 from the server 110 or the memory 204. The third media file 614 may be generated at the frame rate (60 fps) corresponding to the speed of movement of the second object 606. The circuitry 202 may further transmit the extracted the third media file 614 to the second media rendering device 106B from which the selection of the second object 606 is received.

In some embodiments, the circuitry 202 of the media processing apparatus 102 may extract the corresponding media file from the server 110 based on the display frame rate capability of each of the plurality of media rendering devices. The circuitry 202 may extract the stored display characteristics information of the first media rendering device 106A from the memory 204, and accordingly extra the corresponding media file from the server 110 based on the display characteristics information of the first media rendering device 106A. For example, in the display frame rate supported by the first media rendering device 106A is 60 fps, then the circuitry 202 of the media processing apparatus 102 may extract the third media file 614 (i.e. generated at the frame rate 60 fps) and further transmit the extracted the third media file 614 to the first media rendering device 106A. Thus, the disclosed media processing apparatus 102 may dynamically adapt to the frame rate of speed of selected moving objects in the captured image frames, store the plurality of media files generated based on the corresponding frame rate for each moving object, and transmit the corresponding media file to the particular media rendering device based on the selection of objects or the display frame rate capabilities.

Figure 7:
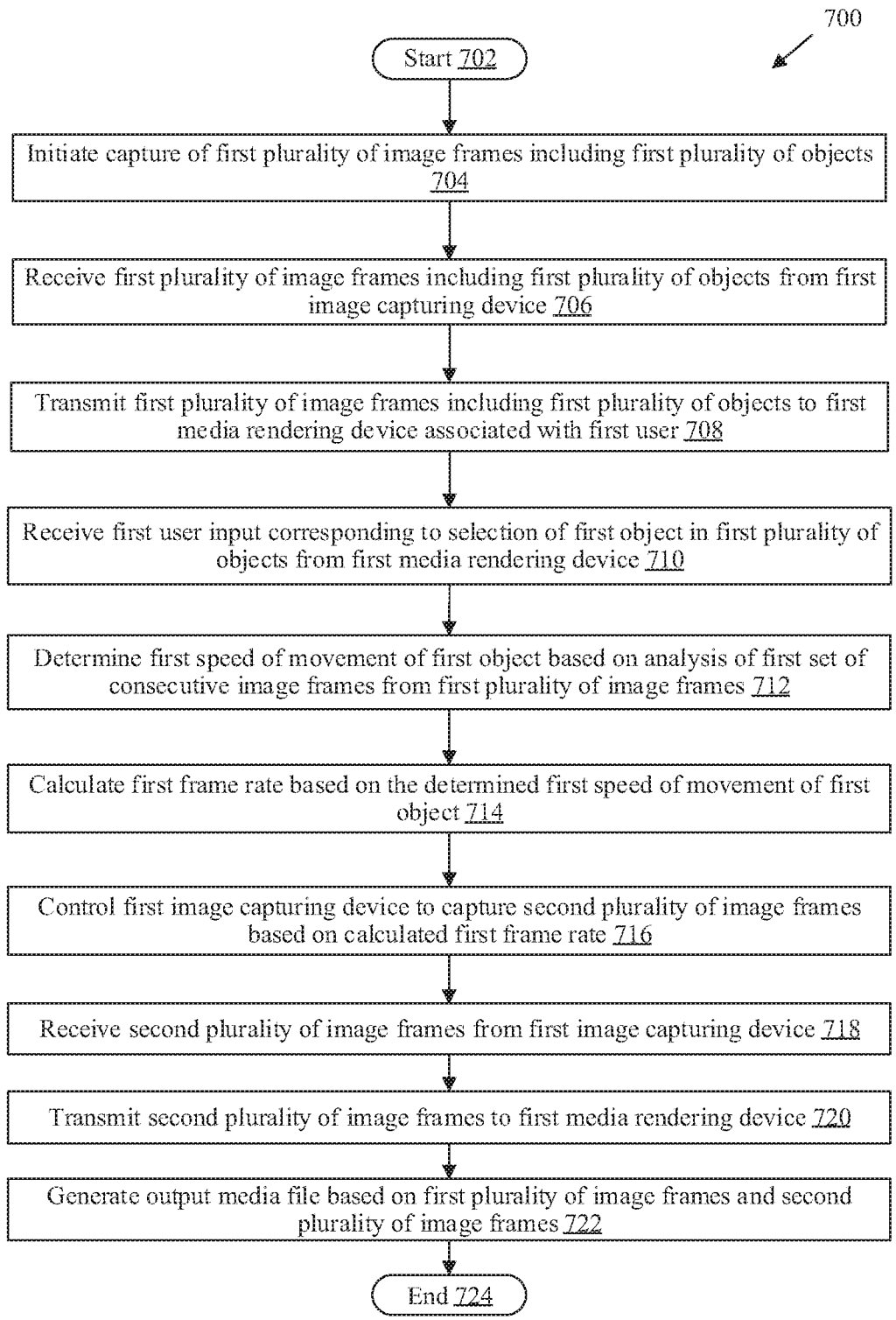
FIG. 7 depicts a flowchart that illustrates exemplary operations for frame rate control for media capture based on rendered object speed, in accordance with an embodiment of the disclosure.

FIG. 7 depicts a flowchart that illustrates exemplary operations for frame rate control for media capture based on rendered object speed, in accordance with an embodiment of the disclosure. FIG. 7 is explained in conjunction with elements from FIGS. 1, 2, 3A, 3B, 4, 5 and 6. With reference to FIG. 7, there is shown a flowchart 700. The operations from 702 to 722 may be implemented on the media processing apparatus 102. The operations may start at 702 and proceed to 704.

At 704, a capture of the first plurality of image frames 108A which may include the first plurality of objects may be initiated. In accordance with an embodiment, the circuitry 202 of the media processing apparatus 102 may be configured to receive a user input to initiate a capture of the first plurality of image frames 108A which may include first plurality of objects. In some embodiments, the user input may an initiation of an image or video capturing application (or API) installed on the media processing apparatus 102 to capture media or video. The first image capturing device 104A may be configured to capture the first plurality of image frames 108A at a default or a defined frame rate. The first plurality of image frames 108A may be captured during the preview mode.

At 706, a first plurality of image frames 108A which may include the first plurality of objects may be received from the first image capturing device 104A. In accordance with an embodiment, the circuitry 202 may be configured to receive the first plurality of image frames 108A which may include the first plurality of objects from the first image capturing device 104A as described in detail, for example, in FIGS. 1 and 3A.

At 708, the first plurality of image frames which may include the first plurality of objects may be transmitted to the first media rendering device 106A associated with a first user 114A. In accordance with an embodiment, the circuitry 202 may be configured to transmit the first plurality of image frames 108A to the first media rendering device 106A associated with the first user 114A. In some embodiments, the circuitry 202 may be configured to transmit the first plurality of image frames 108A to the plurality of media rendering devices 106.

At 710, a first user input corresponding to the selection 406 of the first object 308 in the first plurality of objects may be received from the first media rendering device 106A. In accordance with an embodiment, the circuitry 202 may be configured to receive the first user input corresponding to the selection 406 of the first object 308 from the first media rendering device 106A. as described in detail, for example, in FIG. 4

At 712, a first speed of movement of the first object 308 may be determined based on an analysis of the first set of consecutive image frames 302, 304, 306 from the first plurality of image frames 108A. In accordance with an embodiment, the circuitry 202 may be configured to determine the first speed of movement of the first object 308 based on the analysis of the first set of consecutive image frames 302, 304, 306 from the first plurality of image frames 108A as described in detail, for example, in FIG. 3A.

At 714, a first frame rate may be calculated based on the determined first speed of movement of the first object 308. In accordance with an embodiment, the circuitry 202 may be configured to calculate the first frame rate based on the determined first speed of movement of the first object 308 as described in detail, for example, in FIGS. 3A-3B and Tables 1-2.

At 716, the first image capturing device 104A may be controlled to capture the second plurality of image frames 108B based on the calculated first frame rate. In accordance with an embodiment, the circuitry 202 may be configured to control the first image capturing device 104A to capture the second plurality of image frames 108B based on the calculated first frame rate. The first image capturing device 104A may capture the second plurality of image frames 108B based on the calculated first frame rate. The second plurality of image frames 108B may be captured during the recording mode.

At 718, the second plurality of image frames 108B may be received from the first image capturing device 104A. In accordance with an embodiment, the circuitry 202 may be configured to receive the second plurality of image frames 108B from the first image capturing device 104A, through the communication network 112.

At 720, the second plurality of image frames 108B may be transmitted to the first media rendering device 106A. In accordance with an embodiment, the circuitry 202 may be configured to transmit the second plurality of image frames 108B to the first media rendering device 106A or to the plurality of media rendering devices 106.

At 722, an output media file may be generated based on the first plurality of image frames 108A and the second plurality of image frames 108B. In accordance with an embodiment, the circuitry 202 may be configured to generate the output media file based on the first plurality of image frames 108A and the second plurality of image frames 108B captured at the first frame rate. The generation of the output media file is described in detail, for example, in FIG. 4.

Various embodiments of the disclosure may provide a non-transitory computer readable medium and/or storage medium having stored thereon, instructions executable by a machine and/or a computer to operate a media processing apparatus. The instructions may cause the machine and/or computer to perform operations which include reception of a first plurality of image frames (including a first plurality of objects) from a first image capturing device associated with the media processing apparatus. Further, a first user input corresponding to a first object from the first plurality of objects may be received from a first media rendering device. Further, a first speed of movement of the first object may be determined based on an analysis of a first set of consecutive image frames from the first plurality of image frames. Further, a first frame rate may be calculated based on the determined first speed of movement of the first object from the first plurality of image frames. The first image capturing device may capture a second plurality of image frames at the first frame rate. Further, the captured second plurality of image frames may be transmitted to the first media rendering device.

Exemplary aspects of the disclosure may include a media processing apparatus (such as the media processing apparatus 102 of FIG. 1) that includes circuitry (such as the circuitry 202). The circuitry may be configured to receive a first plurality of image frames from a first image capturing device associated with the media processing apparatus. The first plurality of image frames are captured over a first time period and includes a first plurality of objects. The circuitry may be further configured to transmit the received first plurality of image frames to the first media rendering device. The circuitry may be further configured to receive a first user input from a first media rendering device different from the media processing apparatus. The first user input may correspond to a first object from the first plurality of objects. The circuitry may be further configured to determine a first speed of movement of the first object based on an analysis of a first set of consecutive image frames from the first plurality of image frames. The circuitry may be further configured to calculate a first frame rate based on the determined first speed of movement of the first object. The first image capturing device may capture a second plurality of image frames based on the calculated first frame rate. The circuitry may be further configured to transmit the captured second plurality of image frames to the first media rendering device.

In accordance with an embodiment, the circuitry may be configured to transmit the received first plurality of image frames to the first media rendering device and receive the first user input from the first media rendering device based on the transmitted first plurality of image frames. In accordance with an embodiment, the circuitry may be configured to determine a speed of movement of each of a set of moving objects from the first plurality of objects and transmit object identification information about the set of moving objects and the determined speed of movement of each of the set of moving objects to the first media rendering device.

In accordance with an embodiment, the first media rendering device displays the received first plurality of image frames on a display screen associated with the first media rendering device. The first user input corresponds to a selection of the first object from the first plurality of objects based on one of, but not limited to, click-input, a touch-input, a hand gesture, or an eye movement of a user associated with the first media rendering device.

In accordance with an embodiment, the circuitry may be further configured to retrieve display characteristics information of the first media rendering device from the first media rendering device. The display characteristics information may indicate a display frame rate supported by the first media rendering device. The circuitry may be further configured to calculate the first frame rate based on the retrieved display characteristics information of the first media rendering device.

In accordance with an embodiment, the circuitry may be further configured to determine a change in pixel information of the first object in the first set of consecutive image frames and determine the first speed of movement of the first object based on the determined change in the pixel information of the first object.

In accordance with an embodiment, the circuitry may be further configured to determine a distance between the first object and the first image capturing device, and determine the first speed of movement of the first object based on the determined distance and the determined change in the pixel information.

In accordance with an embodiment, the circuitry may be further configured to receive motion information from the first image capturing device. The motion information may indicate a movement of the first image capturing device in three-dimensional (3D) space. The circuitry may be further configured to determine the first speed of movement of the first object based on the received motion information, the determined distance, and the determined change in the pixel information.

In accordance with an embodiment, the circuitry may be further configured to calculate the first frame rate based on the determined first speed of movement of the first object and a change in pixel information of the first object in the first set of consecutive image frames. In accordance with an embodiment, the circuitry may be further configured to receive a second user input from a second media rendering device different from the media processing apparatus and the first media rendering device. The second user input may correspond to a second object from the first plurality of objects. The circuitry may be further configured to determine a second speed of movement of the second object based on the analysis of the first set of consecutive image frames from the first plurality of image frames. The circuitry may be further configured to calculate the first frame rate based on the determined first speed of movement of the first object and the second speed of movement of the second object. In accordance with an embodiment, the calculated first frame rate may be maximum frame rate among a frame rate corresponding to the determined first speed of movement of the first object and a frame rate corresponding to the determined second speed of movement of the second object.

In accordance with an embodiment, the circuitry may be further configured to update the captured second plurality of image frames based on a second frame rate different from the first frame rate and transmit the updated second plurality of image frames to the first media rendering device. In accordance with an embodiment, the first plurality of image frames may be captured at a default frame rate of the first image capturing device over the first time period. The circuitry may be further configured to generate a second media file which includes the second plurality of image frames captured at the first frame rate over a second time period, update the first plurality of image frames at the first frame rate to generate a first media file, and generate an output media file based on a combination of the first media file captured over the first time period and the second media file captured over the second time period.

In accordance with an embodiment, the circuitry may be further configured to generate a plurality of media files. Each of the plurality of media files may include the captured second plurality of image frames updated based on a different frame rate. The circuitry may be further configured to receive a second user input from a second media rendering device. The second user input may correspond to a second object from a second plurality of objects included in the second plurality of image frames. The circuitry may be further configured to determine a second speed of movement of the second object based on an analysis of a second set of consecutive image frames from the second plurality of image frames, select a media file from the plurality of media files based on a second frame rate associated with the determined second speed of movement of the second object and transmit the selected media file to the second media rendering device.

In accordance with an embodiment, the circuitry may be further configured to determine a speed of movement of each of a set of moving objects from the first plurality of objects including the first object. The circuitry may be further configured to calculate an average of the speed of movement of each of the set of moving objects and calculate the first frame rate based on the calculated average of the speed of movement of each of the set of moving objects.

In accordance with an embodiment, the circuitry may be further configured to detect an absence of the first object in a second set of consecutive image frames from the second plurality of image frames. The circuitry may be further configured to calculate the first frame rate based on the detected absence of the first object in the second set of consecutive image frames. In accordance with an embodiment, the circuitry may be further configured to receive a second user input from a second media rendering device different from the first media rendering device. The second user input may correspond to a second object from the plurality of objects and may be different from the first object. The circuitry may be further configured to calculate the first frame rate based on a second speed of movement of the second object.

In accordance with an embodiment, the circuitry may be further configured to determine a speed of movement of each of a set of moving objects which may be other than the first object. The circuitry may be further configured to calculate an average of the speed of movement of each of the set of moving objects and calculate the first frame rate based on the calculated average of the speed of movement of each of the set of moving objects.

In accordance with an embodiment, the circuitry is further configured to transmit information about the calculated first frame rate to a plurality of image capturing devices which include the first image capturing device. In accordance with an embodiment, the circuitry is further configured to receive a third plurality of image frames from a second image capturing device associated with the media processing apparatus. The third plurality of image frames may be captured over a second time period and may include a second plurality of objects. The circuitry may be further configured to receive a second user input from the first media rendering device. The second user input may correspond to a second object from the second plurality of objects. The circuitry may be further configured to determine a second speed of movement of the second object based on an analysis of a second set of consecutive image frames from the third plurality of image frames. The circuitry may be further configured to calculate a second frame rate based on the determined first speed of movement of the first object and the second speed of movement of the second object, and transmit information about the calculated second frame rate to each of the first image capturing device and the second image capturing device. The first field of view (FOV) of the first image capturing device may be different from a second FOV of the second image capturing device.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A media processing apparatus, comprising:
   circuitry configured to:
      receive a first plurality of image frames from a first image capturing device associated with the media processing apparatus, wherein
         the first plurality of image frames is captured over a first time period, and
         the first plurality of image frames includes a first plurality of objects;
      receive a first user input from a first media rendering device different from the media processing apparatus, wherein the first user input corresponds to a first object from the first plurality of objects;
      receive motion information from the first image capturing device, wherein the motion information indicates a movement of the first image capturing device in a three-dimensional (3D) space;

determine a first speed of movement of the first object based on:
- the movement of the first image capturing device, and
- an analysis of a first set of consecutive image frames from the first plurality of image frames;

calculate a first frame rate based on the determined first speed of movement of the first object, wherein the first image capturing device captures a second plurality of image frames at the first frame rate;

receive the second plurality of image frames from the first image capturing device, wherein the second plurality of image frames includes a second plurality of objects;

detect an absence of the first object in a second set of consecutive image frames from the second plurality of image frames;

receive, from the first media rendering device, a second user input for a selection of a second object from the second plurality of objects based on the detection of the absence of the first object in the second set of consecutive image frames;

select the second object from the second plurality of objects based on the received second user input;

determine a second speed of movement of the second object from the second plurality of objects based on the detected absence of the first object in the second set of consecutive image frames;

calculate a second frame rate based on the determined second speed of movement of the second object;

update the second plurality of image frames based on the second frame rate; and transmit the updated second plurality of image frames to the first media rendering device.

2. The media processing apparatus according to claim 1, wherein the circuitry is further configured to:
transmit the first plurality of image frames to the first media rendering device; and
receive the first user input from the first media rendering device based on the transmitted first plurality of image frames.

3. The media processing apparatus according to claim 2, wherein the circuitry is further configured to:
determine a speed of movement of each of a set of moving objects from the first plurality of objects; and
transmit object identification information and the determined speed of movement of each of the set of moving objects to the first media rendering device, wherein the object identification information corresponds to the set of moving objects.

4. The media processing apparatus according to claim 2, wherein
the first media rendering device displays the first plurality of image frames on a display screen associated with the first media rendering device, and
the first user input corresponds to a selection of the first object from the first plurality of objects based on one of a click-input, a touch-input, a hand gesture, or an eye movement of a user associated with the first media rendering device.

5. The media processing apparatus according to claim 1, wherein the circuitry is further configured to:
retrieve display characteristics information of the first media rendering device, wherein the display characteristics information indicates a display frame rate supported by the first media rendering device; and
calculate the first frame rate based on the retrieved display characteristics information of the first media rendering device.

6. The media processing apparatus according to claim 1, wherein the circuitry is further configured to:
determine a change in pixel information of the first object in the first set of consecutive image frames; and
determine the first speed of movement of the first object based on the determined change in the pixel information of the first object.

7. The media processing apparatus according to claim 6, wherein the circuitry is further configured to:
determine a distance between the first object and the first image capturing device; and
determine the first speed of movement of the first object based on the determined distance and the determined change in the pixel information.

8. The media processing apparatus according to claim 1, wherein the circuitry is further configured to calculate the first frame rate based on the determined first speed of movement of the first object and a change in pixel information of the first object in the first set of consecutive image frames.

9. The media processing apparatus according to claim 1, wherein the circuitry is further configured to:
receive a third user input from a second media rendering device different from the first media rendering device, wherein the third user input corresponds to a third object from the first plurality of objects;
determine a third speed of movement of the third object based on the analysis of the first set of consecutive image frames from the first plurality of image frames; and
calculate the first frame rate based on the determined first speed of movement of the first object and the third speed of movement of the third object.

10. The media processing apparatus according to claim 9, wherein the calculated first frame rate is a maximum frame rate among a frame rate corresponding to the determined first speed of movement of the first object and a frame rate corresponding to the determined third speed of movement of the third object.

11. The media processing apparatus according to claim 1, wherein the circuitry is further configured to:
update the captured second plurality of image frames based on a third frame rate different from the second frame rate; and
transmit the updated second plurality of image frames to the first media rendering device.

12. The media processing apparatus according to claim 1, wherein
the first plurality of image frames is captured at a default frame rate of the first image capturing device over the first time period, and
the circuitry is further configured to:
generate a first media file that includes the second plurality of image frames captured at the second frame rate over a second time period;
update the first plurality of image frames at the second frame rate;
generate a second media file based on the updated first plurality of image frames; and generate an output media file based on a combination of the second media file captured over the first time period and the first media file captured over the second time period.

13. The media processing apparatus according to claim 1, wherein the circuitry is further configured to:
update the second plurality of image frames based on a third frame rate different from the second frame rate;
generate a plurality of media files, wherein each of the plurality of media files includes the updated second plurality of image frames;
receive a third user input from a second media rendering device, wherein the third user input corresponds a third object from the second plurality of objects included in the second plurality of image frames;
determine a third speed of movement of the third object based on an analysis of the second set of consecutive image frames from the second plurality of image frames;
select a media file from the plurality of media files based on a fourth frame rate associated with the determined third speed of movement of the third object; and
transmit the selected media file to the second media rendering device.

14. The media processing apparatus according to claim 1, wherein the circuitry is further configured to:
determine a speed of movement of each of a set of moving objects from the first plurality of objects, wherein the set of moving objects include the first object;
calculate an average of the speed of movement of each of the set of moving objects; and
calculate the first frame rate based on the calculated average of the speed of movement of each of the set of moving objects.

15. The media processing apparatus according to claim 1, wherein the circuitry is further configured to:
receive a third user input from a second media rendering device different from the first media rendering device, wherein
the third user input corresponds to a third object from the first plurality of objects, and
the third object is different from the first object; and
calculate a third frame rate based on a third speed of movement of the third object.

16. The media processing apparatus according to claim 1, wherein the circuitry is further configured to:
determine a speed of movement of each of a set of moving objects from the first plurality of objects, wherein the set of moving objects is different from the first object;
calculate an average of the speed of movement of each of the set of moving objects; and
calculate the second frame rate based on the calculated average of the speed of movement of each of the set of moving objects.

17. The media processing apparatus according to claim 1, wherein
the circuitry is further configured to transmit information associated with the calculated second frame rate to a plurality of image capturing devices, and
the plurality of image capturing devices includes the first image capturing device.

18. The media processing apparatus according to claim 1, wherein the circuitry is further configured to:
receive a third plurality of image frames from a second image capturing device associated with the media processing apparatus, wherein the third plurality of frames is captured over a second time period and includes a third plurality of objects;
receive a third user input from the first media rendering device, wherein the third user input corresponds to a third object from the third plurality of objects;
determine a third speed of movement of the third object based on an analysis of a third set of consecutive image frames from the third plurality of image frames;
calculate a third frame rate based on the determined first speed of movement of the first object and the third speed of movement of the third object; and
transmit information associated with the calculated third frame rate to each of the first image capturing device and the second image capturing device.

19. The media processing apparatus according to claim 18, wherein a first field of view (FOV) of the first image capturing device is different from a second FOV of the second image capturing device.

20. A method, comprising:
in a media processing apparatus:
receiving a first plurality of image frames from an image capturing device associated with the media processing apparatus, wherein
the first plurality of image frames is captured over a specific time period, and
the first plurality of image frames includes a first plurality of objects;
receiving a first user input from a media rendering device different from the media processing apparatus, wherein the first user input corresponds to a first object from the first plurality of objects;
receiving motion information from the image capturing device, wherein the motion information indicates a movement of the first image capturing device in a three-dimensional (3D) space;
determining a first speed of movement of the first object based on:
the movement of the image capturing device, and
an analysis of a first set of consecutive image frames from the first plurality of image frames;
calculating a first frame rate based on the determined first speed of movement of the first object, wherein the image capturing device captures a second plurality of image frames at the first frame rate;
receiving the second plurality of image frames from the image capturing device, wherein the second plurality of image frames includes a second plurality of objects;
detecting an absence of the first object in a second set of consecutive image frames from the second plurality of image frames;
receiving, from the media rendering device, a second user input for a selection of a second object from the second plurality of objects based on the detection of the absence of the first object in the second set of consecutive image frames;
selecting the second object from the second plurality of objects based on the received second user input;
determining a second speed of movement of the second object from the second plurality of objects based on the detected absence of the first object in the second set of consecutive image frames;
calculating a second frame rate based on the determined second speed of movement of the second object;
updating the second plurality of image frames based on the second frame rate; and
transmitting the updated second plurality of image frames to the media rendering device.

21. The media processing apparatus according to claim 12, wherein
the circuitry is further configured to:
upscale the second frame rate of the first media file to generate at least one of the second media file or a third media file based on a determination that the second frame rate at which the first media file is generated is lower than the first frame rate of the first object; and
the upscale of the second frame rate is based on at least one of a specific setting or a user preference.

22. The media processing apparatus according to claim 17, wherein the circuitry is further configured to synchronize a third frame rate of a second image capturing device of the plurality of image capturing devices with the calculated second frame rate of the first image capturing device of the plurality of image capturing devices.

* * * * *